United States Patent [19]

Hoffman et al.

[11] Patent Number: 5,344,331

[45] Date of Patent: Sep. 6, 1994

[54] ELECTRICAL CONNECTOR SYSTEM, ESPECIALLY FOR ELECTRIC VEHICLES

[75] Inventors: Ernest G. Hoffman, Middlefield; John C. Anthony, Fairfield, both of Conn.

[73] Assignee: Hubbell Incorporated, Orange, Conn.

[21] Appl. No.: 12,124

[22] Filed: Feb. 1, 1993

Related U.S. Application Data

[63] Continuation-in-part of Ser. No. 5,108, Jan. 15, 1993.

[51] Int. Cl.⁵ .......................................... H01R 13/453
[52] U.S. Cl. .................................... 439/138; 439/310
[58] Field of Search ............ 439/34, 35, 131, 136–141, 439/259, 310, 341, 474, 923, 142, 143

[56] References Cited

U.S. PATENT DOCUMENTS

| | | | |
|---|---|---|---|
| 3,270,267 | 8/1966 | Nolte, Jr. | 320/56 |
| 3,950,059 | 4/1976 | Anhalt et al. | |
| 3,952,239 | 4/1976 | Owings et al. | 320/2 |
| 4,158,802 | 6/1979 | Rose, II | 302/2 |
| 4,203,640 | 5/1980 | Bice et al. | 439/139 |
| 4,217,019 | 8/1980 | Cameron | 439/138 |
| 4,431,241 | 2/1984 | Hazelhurt | 339/43 |
| 4,624,472 | 11/1986 | Stuart et al. | 280/420 |
| 4,718,862 | 1/1988 | Beeman | 439/482 |
| 4,843,477 | 6/1989 | Mizutani et al. | 358/248 |
| 5,104,331 | 4/1992 | Goble | 439/341 |
| 5,174,772 | 12/1992 | Vranish | 439/139 |

FOREIGN PATENT DOCUMENTS

| | | | |
|---|---|---|---|
| 0049625 | 4/1982 | European Pat. Off. | 439/350 |
| 1926582 | 11/1970 | Fed. Rep. of Germany | 439/345 |
| 208053 | 3/1968 | U.S.S.R. | 439/345 |

OTHER PUBLICATIONS

"Infrastructure-EV Charging Meter", Green Car Journal, Nov. 1992, p. 124.

*Primary Examiner*—Neil Abrams
*Attorney, Agent, or Firm*—Jerry M. Presson; David L. Tarnoff

[57] ABSTRACT

An electrical connector system for transmitting electrical energy, and especially designed for use with electric vehicles. The electrical connector assembly includes a male electrical connector or plug with a first set of electrical contacts arranged along a common arc and a female electrical connector or receptacle with a second set of electrical contacts arranged along a common arc. Both the receptacle and the plug has a apertured shutter for selectively covering and uncovering its respective electrical contacts to prevent inadvertent contact with the electrical contacts and to protect the electrical contacts from the environment. In the preferred embodiment, the shutters of the plug and receptacle are rotated to uncover the contacts only after full insertion of the plug into the receptacle. The plug can be inserted into the receptacle with little or no force by the user since the contacts are electrically coupled together by transversely moving the contacts of the receptacle through aligned openings in the shutters to engage the contact of the plug after full insertion of the plug into the receptacle. In a second embodiment, the receptacle is provided with a break-away and manual release mechanism for automatically retracting the contacts of the receptacle from the contacts of the plug.

22 Claims, 17 Drawing Sheets

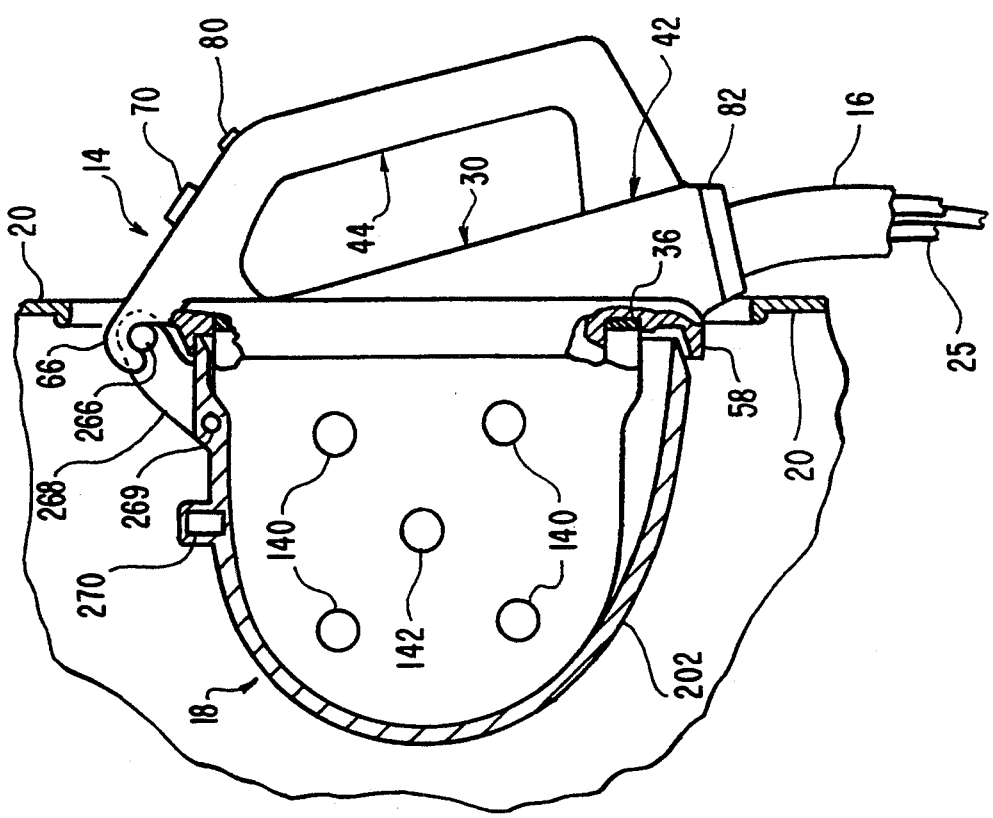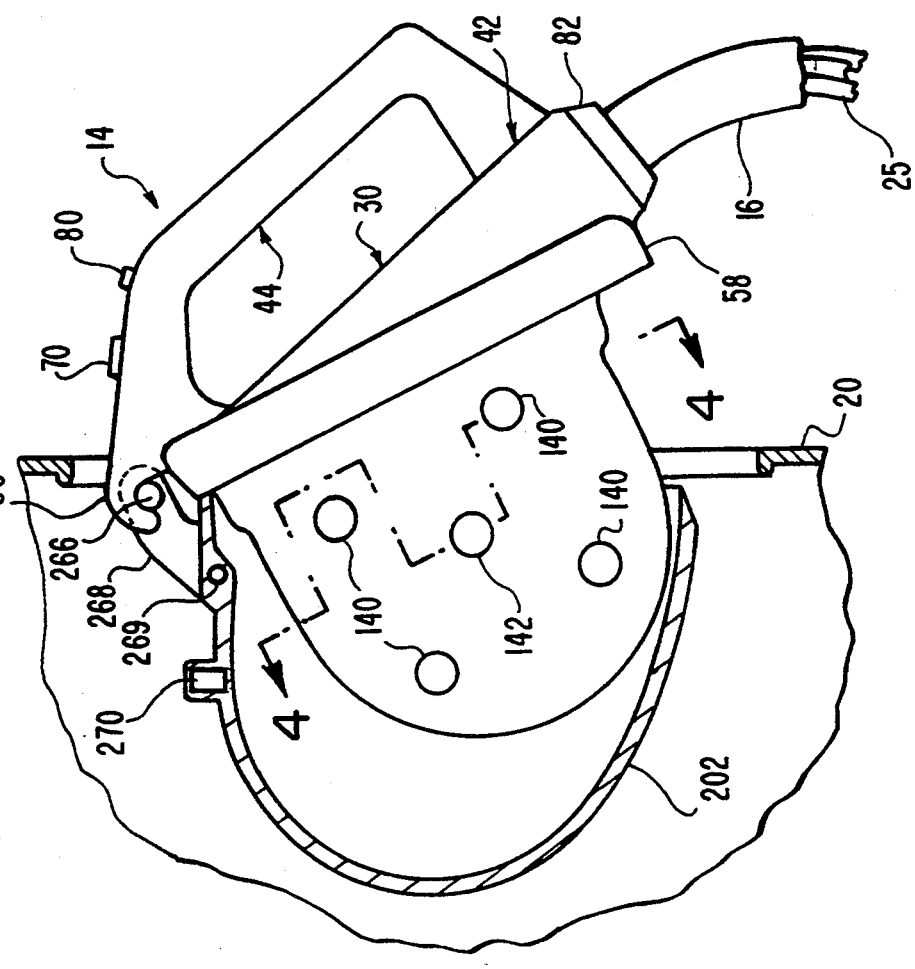

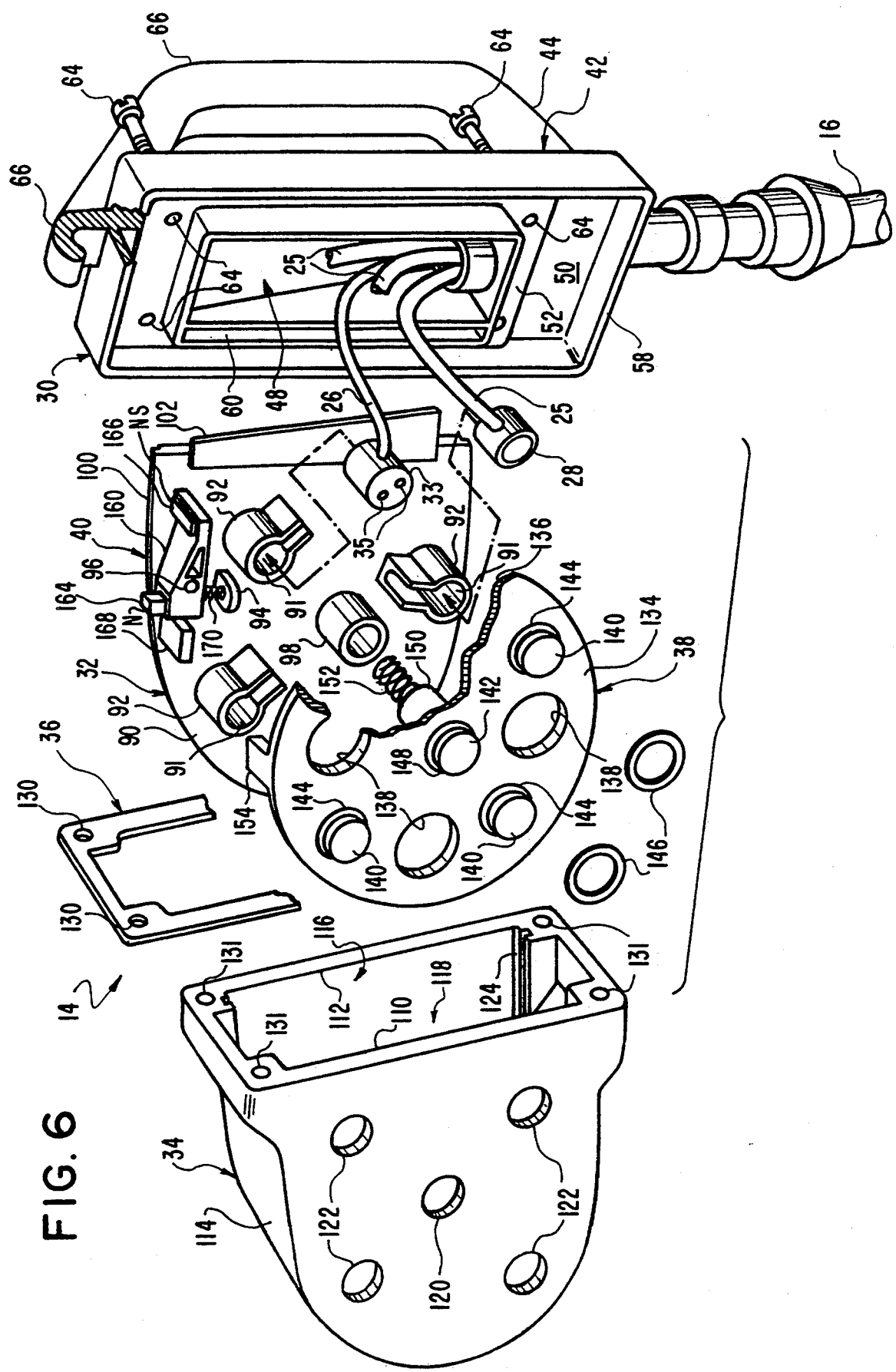

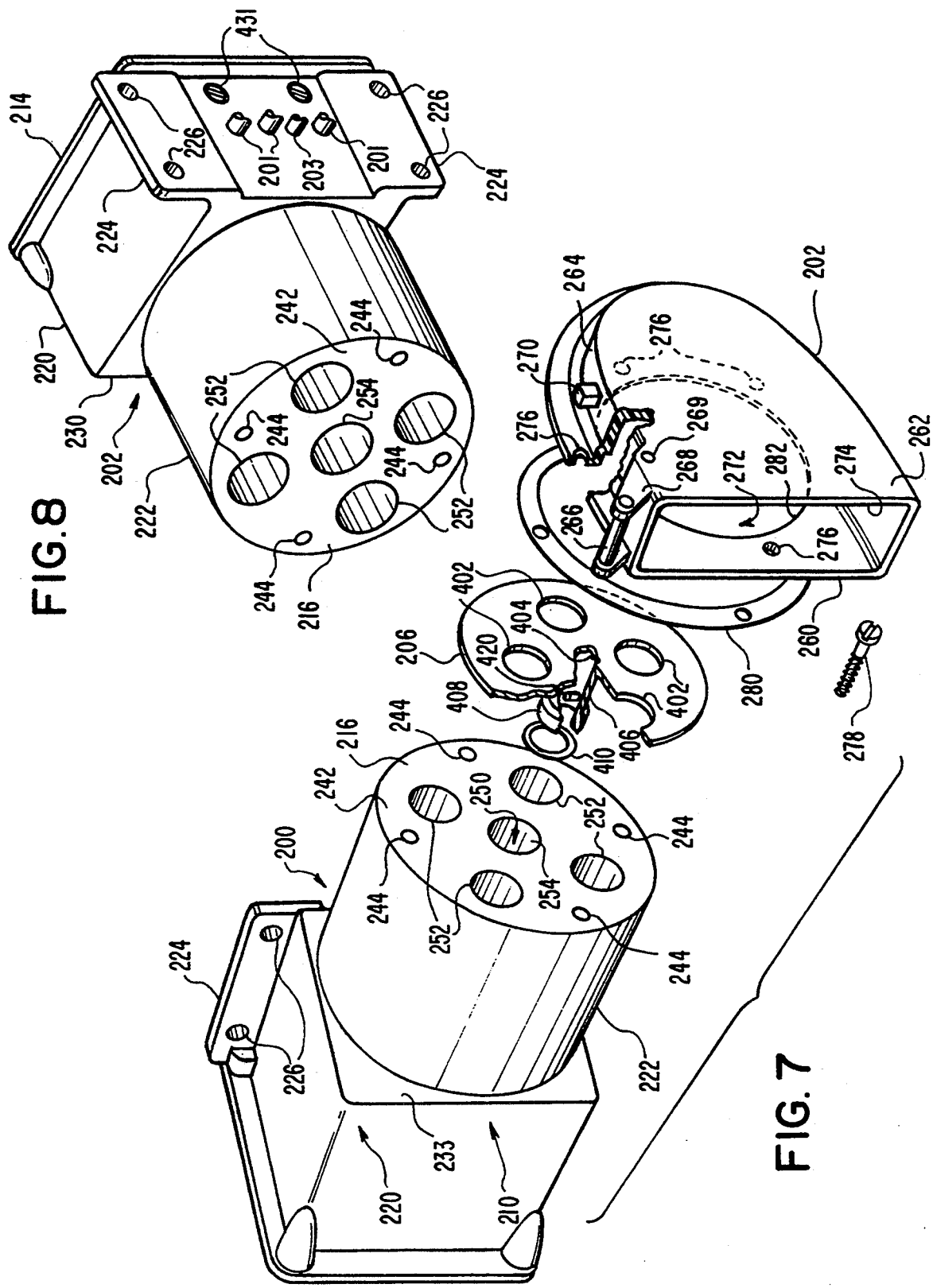

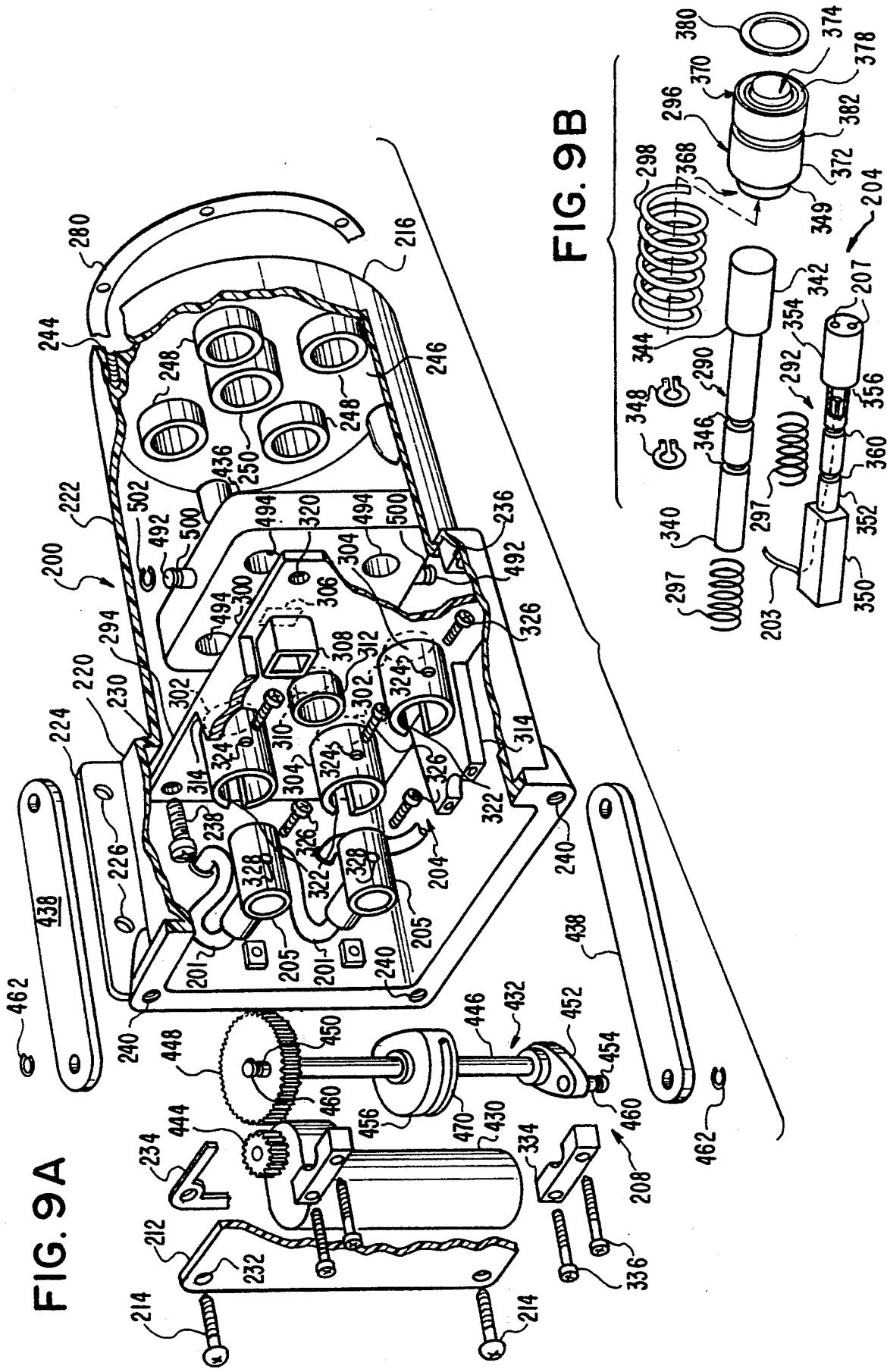

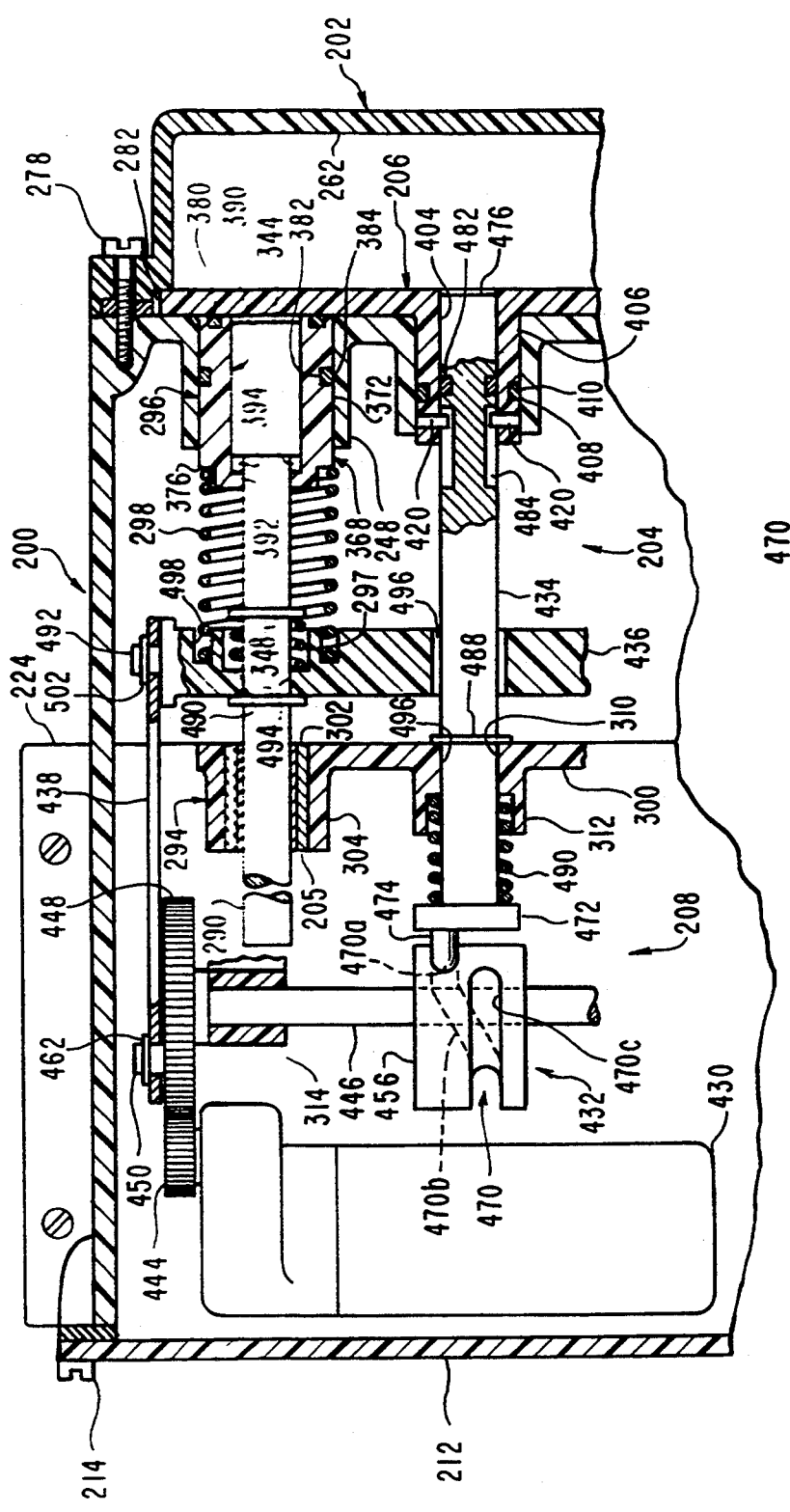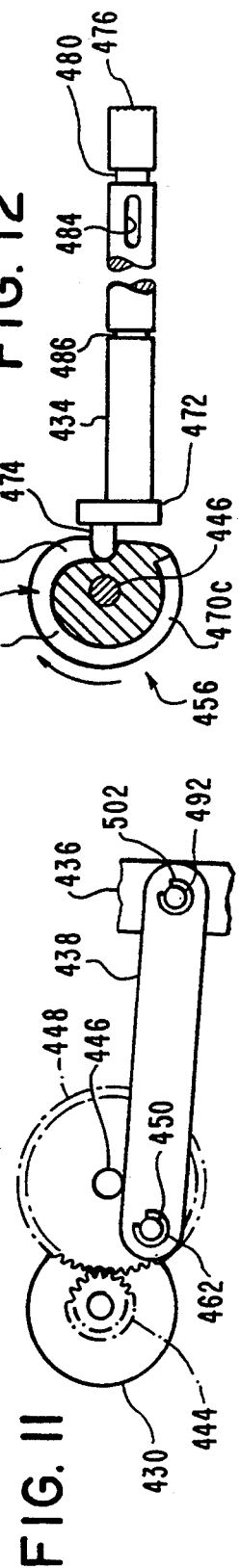

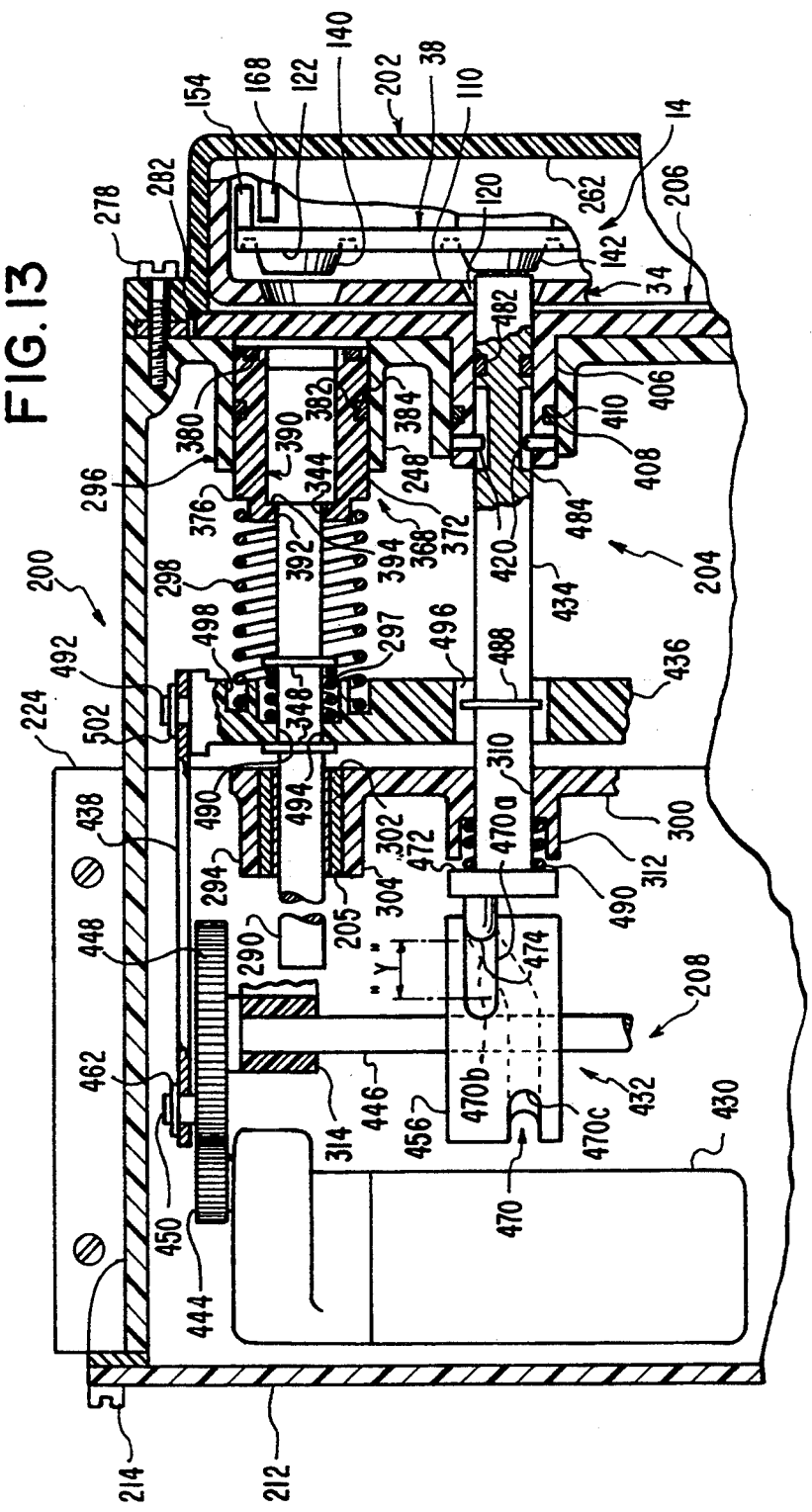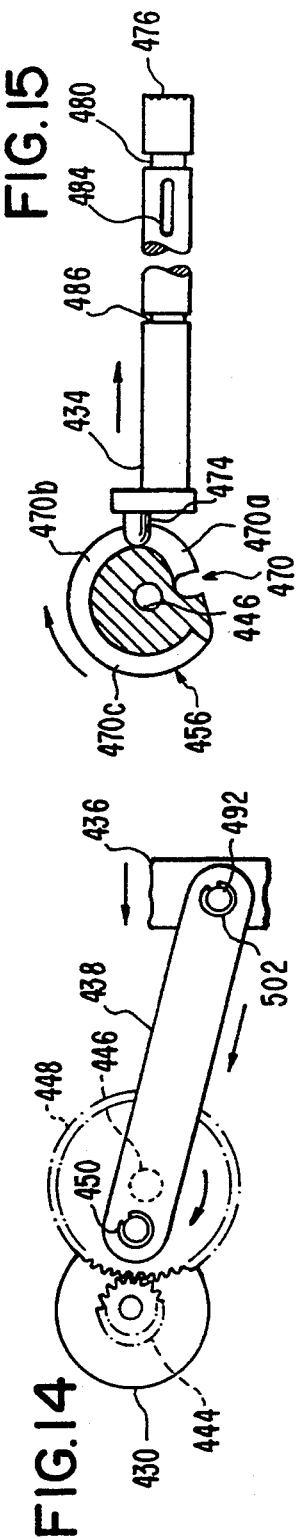

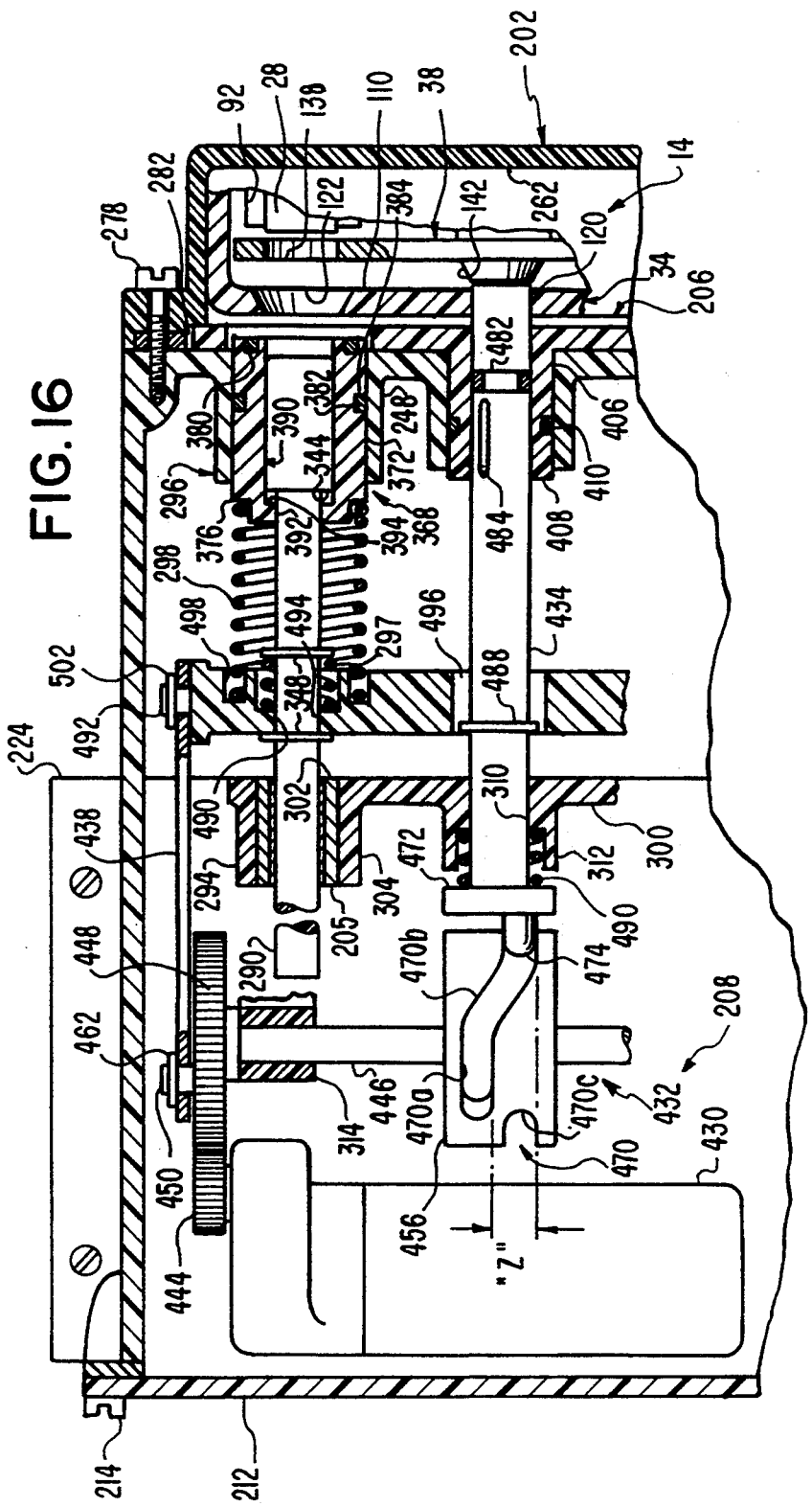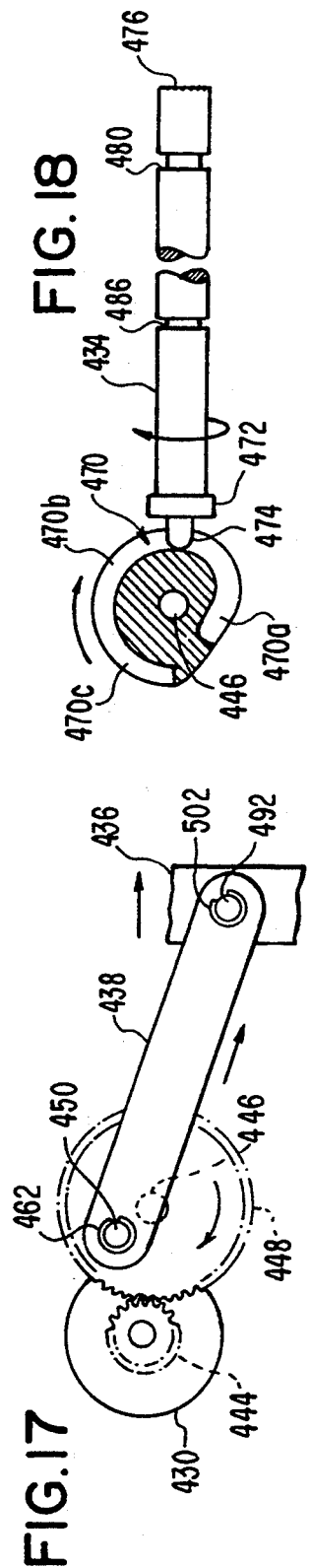

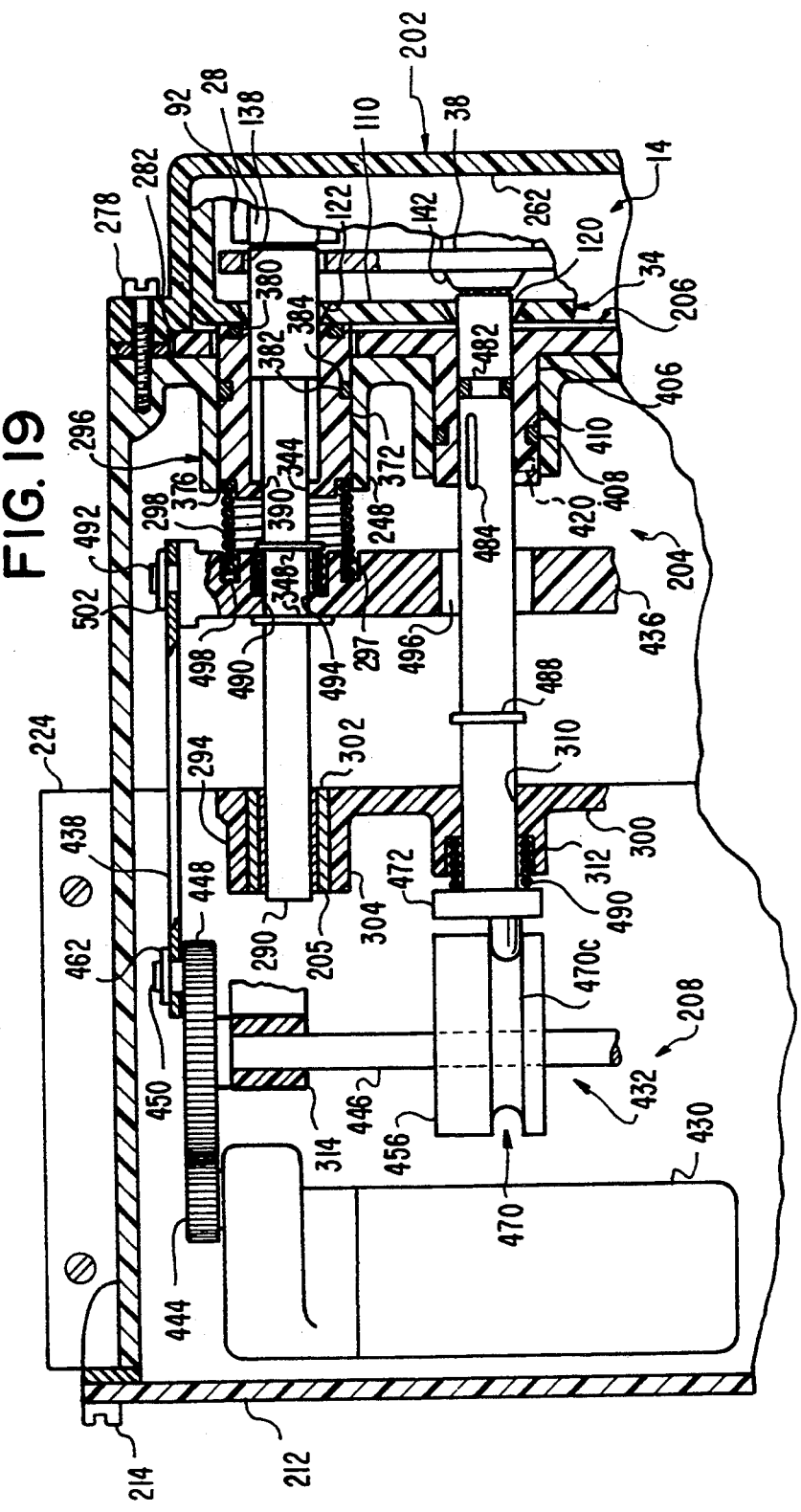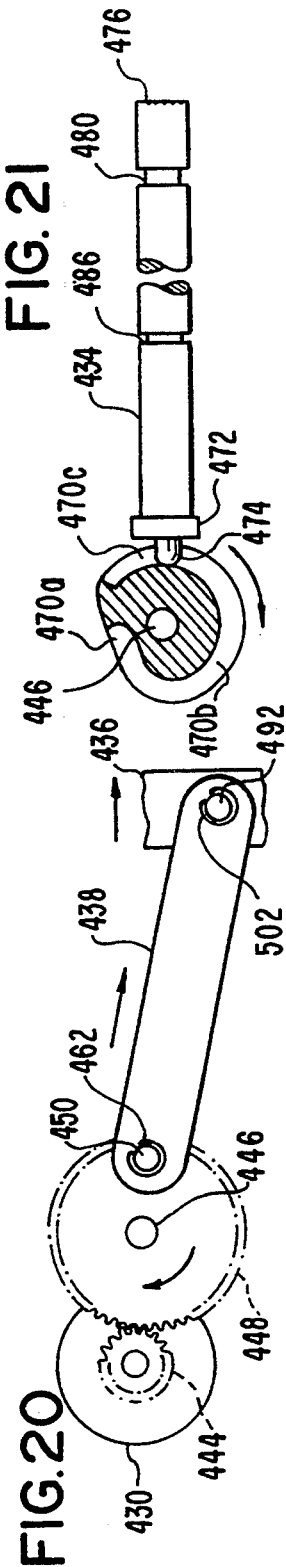

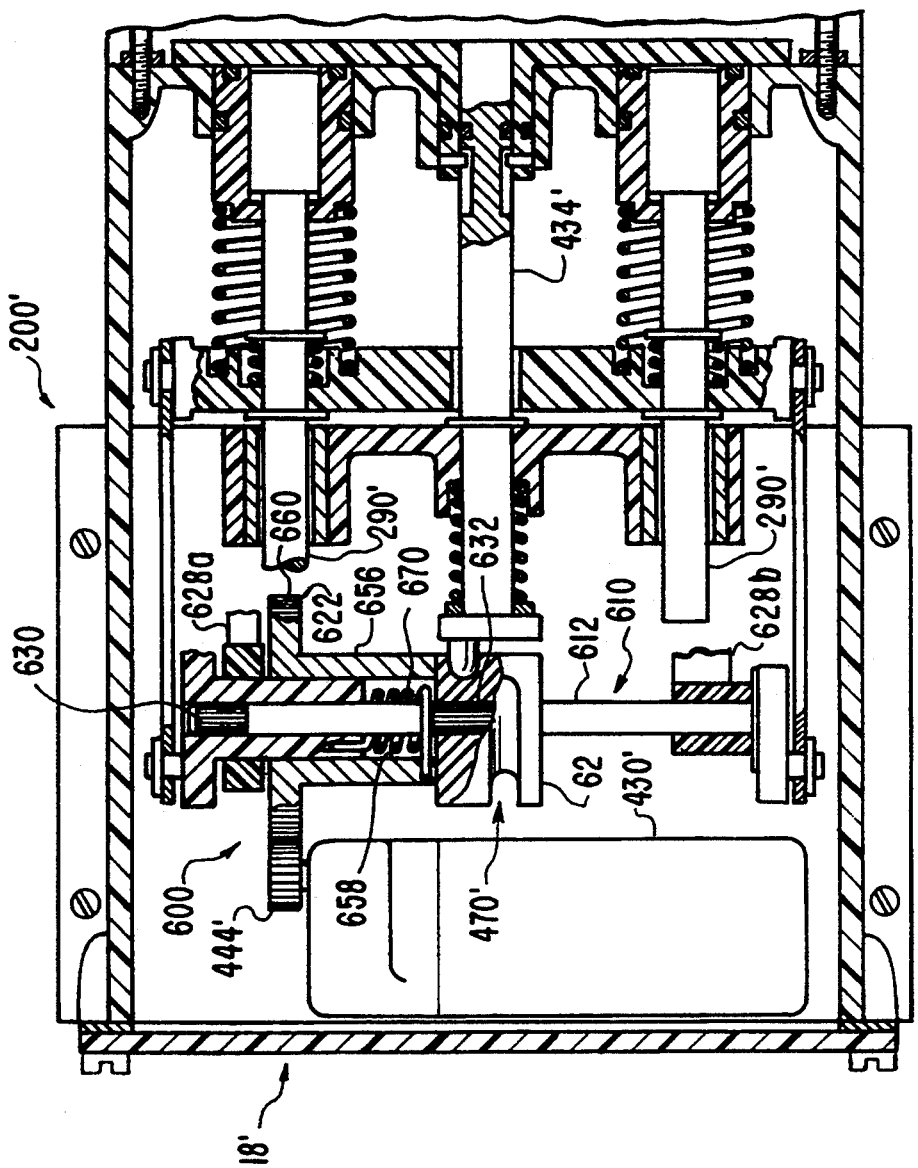

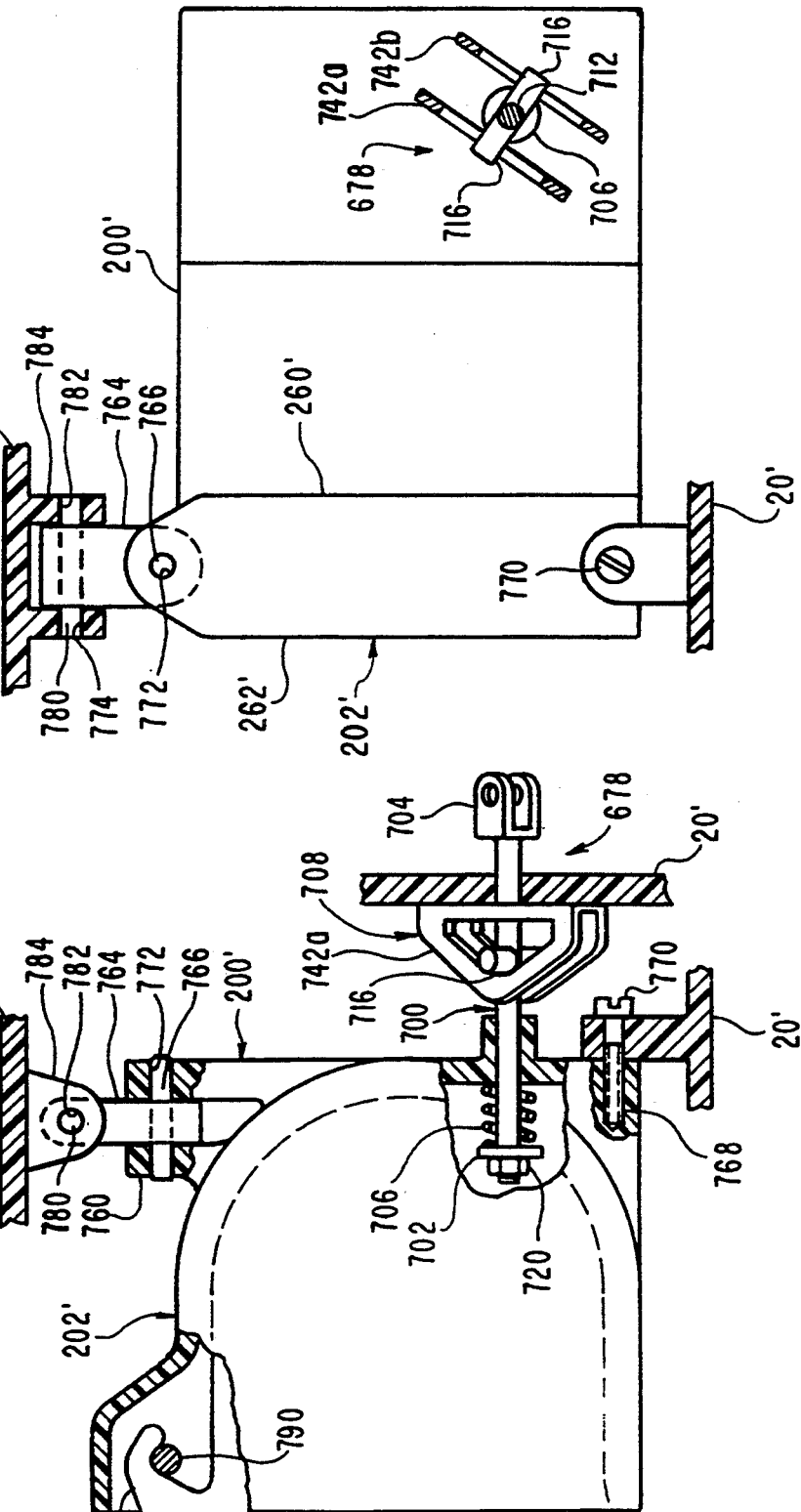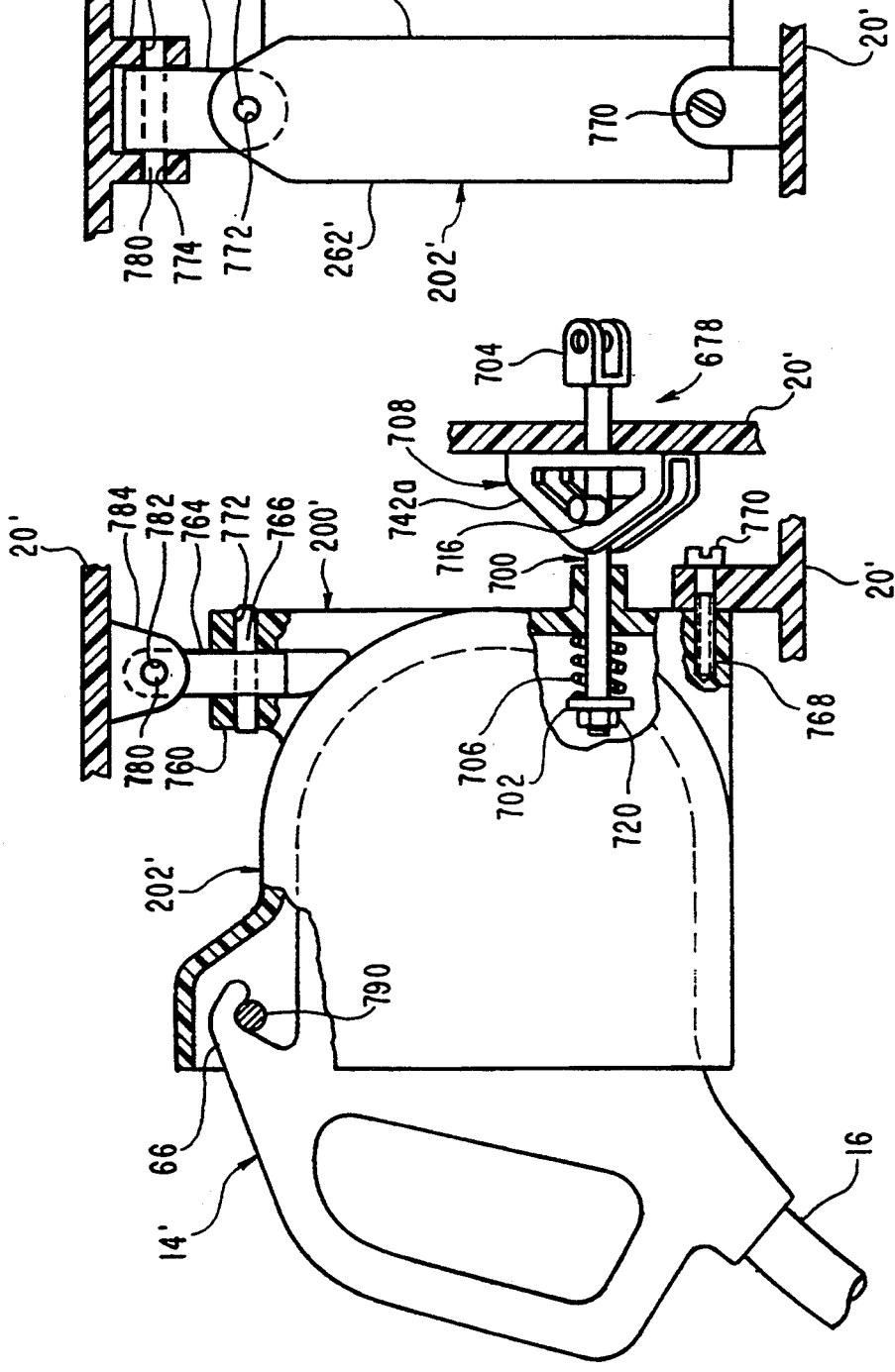

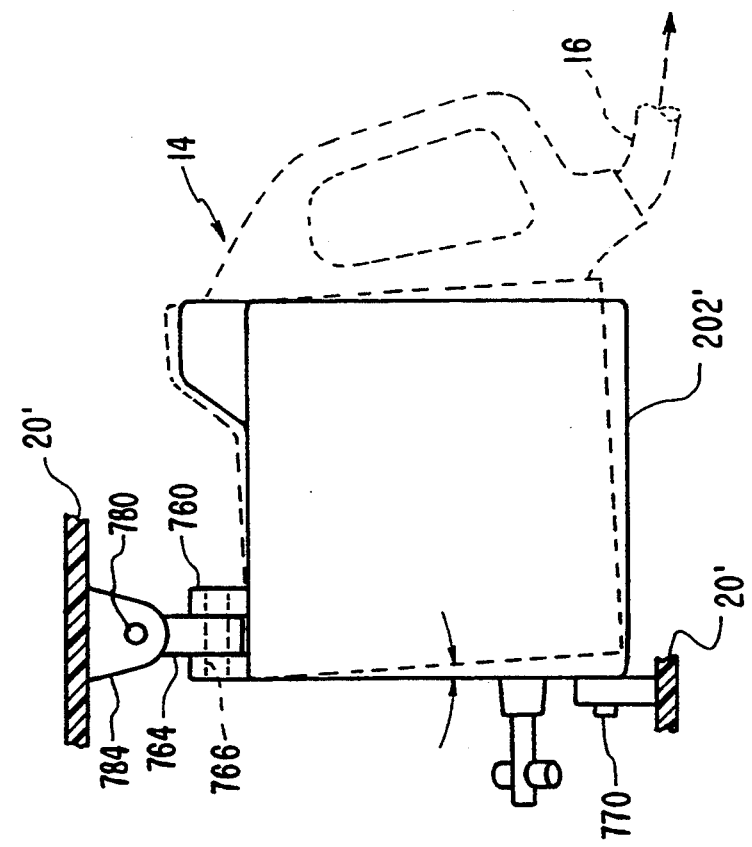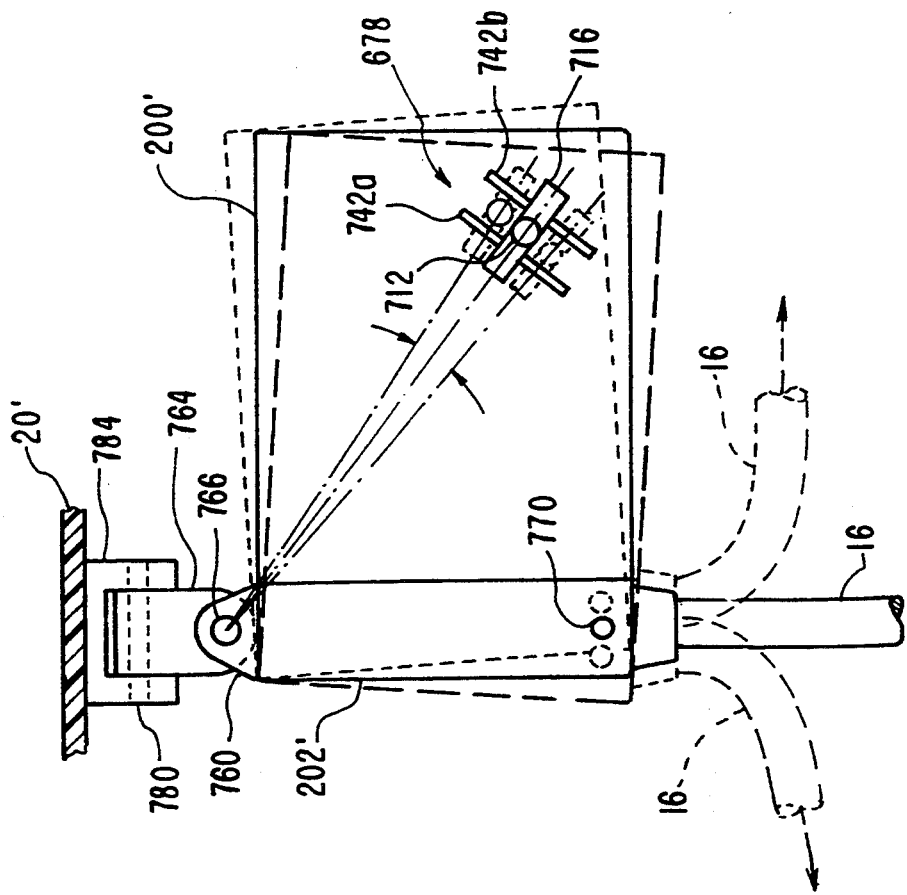

1

ELECTRICAL CONNECTOR SYSTEM, ESPECIALLY FOR ELECTRIC VEHICLES

This is a continuation-in-part application of application Ser. No. 08/005,108, filed Jan. 15, 1993.

FIELD OF THE INVENTION

This invention relates to an electrical connector assembly having a plug or male electrical connector with a first set of contacts arranged along a common arc or circular path and a receptacle or female electrical connector with a second set of contacts arranged along a common arc or circular path. The plug and receptacle mate together for electrically coupling a first set of contacts in the plug with a set of contacts in the receptacle. Specifically, the invention relates to an electrical connector assembly, especially for electric vehicles, in which the electrical contacts of the plug and the receptacle are completely covered or concealed from the user until after insertion of the plug into the receptacle. The plug can be inserted into the receptacle with little or no force.

BACKGROUND OF THE INVENTION

The number of automobiles being operated is continuing to increase, which significantly increases the worldwide air pollution problem. This air pollution problem from automobiles has prompted many countries to regulate the exhaust emissions from automobiles. In fact, the exhaust emissions standards are constantly becoming stricter each year. For example, California regulators have recently passed a law requiring 2% of all vehicles sold in California to be "zero-emissions" or electric powered by 1998. Failure to meet the new emission standard would result in significant fines to automobile manufacturers selling automobiles in California. Accordingly, automobile manufacturers' ability to sell automobiles in California will be hurt if they do not produce an automobile with zero-emissions.

In view of these increasingly stricter emission requirements, automobile manufacturers are beginning to develop electric powered vehicles. Accordingly, it will be necessary to provide the owners of the electric vehicles with a safe and easy way of recharging their batteries. Moreover, electric vehicles have a limited range of travel before requiring their batteries to be recharged. Thus, recharging stations will be needed which are conveniently located and easy to operate in substantially the same manner in which gas stations are currently available for gas powered vehicles.

One example of an electric vehicle and a recharging station for recharging the batteries of electric vehicles is disclosed in U.S. Pat. No. 4,158,802 to Rose, II. The electric vehicle and the recharging station disclosed in the patent issued to Rose, II have many drawbacks. For instance, the contact surface of the vehicle is exposed to the environment which can cause the electrical contact surfaces of the vehicle to corrode. Also, the electrical contact surfaces of the vehicle and the recharging station are exposed to the driver such that the driver of the vehicle could accidentally touch one of the electric contacts and receive an electrical shock. Furthermore, this recharging station would require all electric vehicles to be manufactured within a certain range of sizes and shapes.

In view of the above, it is apparent that there exists a need for an electrical connector assembly for electric vehicles and for electrical recharging stations which will overcome the above problems of the prior art, and which are safe and convenient to operate. This invention addresses this need in the art along with other needs which will become apparent to those skilled in the art once given this disclosure.

SUMMARY OF THE INVENTION

Accordingly, a primary object of the present invention is to provide an electrical connector assembly, especially for electric vehicles, which is safe and convenient to operate.

Another object of the present invention is to provide an electrical connector having its contacts covered or concealed from the user to avoid accidental contact by the user.

Another object of the present invention is to provide an electrical connector assembly having a plug which can be inserted into a receptacle with little or no force.

Another object of the present invention is to provide an electrical connector assembly having a plug with a first set of contacts and a receptacle with a second set of contacts in which both sets of contacts remain covered until after full insertion of the plug into the receptacle.

Still another object of the present invention is to provide a weather-tight electrical connector assembly.

Yet another object of the present invention is to provide an electrical connector assembly in which the contacts of the plug and the contacts of the receptacle move in a direction transverse to the direction of insertion of the plug into the receptacle.

A further object of the present invention is to provide an electrical connector assembly having one electrical connector coupled to a recharging station and another electrical connector coupled to an electric car in which the plug and the receptacle will disengage from each other without damage thereto when an excessively high force is applied to the cable of the plug.

Another object is to provide electrical connectors which are relatively inexpensive and simple to manufacture.

Another object of the present invention is to provide an electrical connector assembly with a contact spacing geometry that permits the addition of contacts without increasing the size of the assembly or compromising the significant electrical characteristics such as creepage distance, terminal spacing and heat rise.

The foregoing objects are basically attained by providing an electrical connector system, the combination comprising: a receptacle having a first set of at least three electrical contacts coupled to the receptacle with the first set of contacts being arranged along a non-linear path; a first shutter movably coupled to the receptacle for selectively covering and exposing the first set of contacts; a plug having a second set of at least three electrical contacts coupled to the plug with the second set of contacts being arranged along a non-linear path and a contact housing coupled to the plug for housing the second set of contacts; a second shutter movably coupled to the cover of the plug for selectively covering and exposing the second set of contacts; and uncovering mechanism coupled to the receptacle and the plug for selectively moving the first and second shutters to uncover the first and second set of contacts, respectively, to permit electrical coupling of the first set of contacts with the second set of contacts, upon insertion of the plug into the receptacle.

The foregoing objects are also basically attained by an electrical connector system, the combination comprising: a receptacle having a first contact housing, a first electrical contact and an inlet cavity; a first shutter movably coupled to the first contact housing for selectively covering and exposing the first contact; a plug having a second contact housing adapted to be received in the inlet cavity of the receptacle and a second electrical contact for electrically coupling with the first contact upon insertion of the second contact housing into the inlet cavity; a second shutter movably coupled to the second contact housing for selectively covering and exposing the second contact; and a sealing assembly coupled to the plug and the receptacle for sealing the first and second contact against the ingress of moisture and other contaminants before and after electrical coupling of the first and second contact.

Other objects, advantages and salient features of the invention will become apparent from the following detailed description, which, taken in conjunction with the annexed drawings, discloses two preferred embodiments of the invention.

BRIEF DESCRIPTION OF THE DRAWINGS

Referring to the drawings which form a part of the original disclosure:

FIG. 3A is a partial elevational view of a male electrical connector or plug just prior to full insertion into a receptacle which is shown in partial cross section with certain parts removed for clarity;

FIG. 3B is a partial elevational view of the male electrical connector of FIG. 3A just after full insertion into the receptacle which is shown in partial cross section with certain parts removed for clarity;

FIG. 6 is a partially exploded perspective view of the male electrical connector or plug illustrated in FIGS. 1-5 in accordance with the present invention;

FIG. 7 is a partially exploded perspective view of the receptacle in accordance with the present invention illustrated in FIG. 2 with certain parts removed or broken away for clarity;

FIG. 8 is a partial perspective view of the rear side of the receptacle illustrated in FIGS. 2 and 7;

FIG. 9A is a partially exploded perspective view of selected parts of the receptacle illustrated in FIG. 7 with certain parts removed or broken away;

FIG. 9B is an exploded perspective view of one of the power contact pins and the communication pin along with their various associated parts;

FIG. 10 is a partial, side cross-sectional view of the receptacle prior to insertion of the plug into the connector pocket of the receptacle in the vehicle with certain parts broken away for clarity;

FIG. 11 is a partial, top plan view of the contact and shutter disk assembly illustrated in FIG. 10 with certain parts removed or broken away for clarity;

FIG. 12 is a partial, transverse cross-sectional view of the rise and lift cam and the shutter control shaft illustrated in FIG. 10;

FIG. 13 is a partial, side cross-sectional view of the receptacle and the plug of the first embodiment with certain parts broken away for clarity, after full insertion of the plug into the connector pocket of the receptacle in the vehicle and approximately 55° of rotation of the crankshaft assembly;

FIG. 14 is a partial, top plan view of the contact and shutter disk assembly illustrated in FIG. 13 with certain parts removed or broken away for clarity;

FIG. 15 is a partial, transverse cross-sectional view of the rise and lift cam and the shutter control shaft illustrated in FIG. 13 after approximately 55° of rotation of the crankshaft assembly from its initial position illustrated in FIGS. 10 and 12;

FIG. 16 is a partial, side cross-sectional view of the receptacle and plug of the first embodiment with certain parts broken away for clarity and after approximately 110° of rotation of the crankshaft assembly from its initial position illustrated in FIG. 10;

FIG. 17 is a partial, top plan view of the contact and shutter disk assembly illustrated in FIG. 16 with certain parts removed or broken away for clarity;

FIG. 18 is a partial, transverse cross-sectional view of the rise and lift cam and the shutter control shaft illustrated in FIG. 16 after approximately 110° of rotation of the crankshaft assembly from its initial position illustrated in FIGS. 10 and 12;

FIG. 19 is a partial, side cross-sectional view of the receptacle and plug of the first embodiment with certain parts broken away for clarity and after approximately 235° of rotation of the crankshaft assembly from its initial position illustrated in FIG. 10;

FIG. 20 is a partial, top plan view of the contact and shutter disk assembly illustrated in FIG. 19 with certain parts removed or broken away for clarity;

FIG. 21 is a partial, transverse cross-sectional view of the rise and lift cam and the shutter control shaft illustrated in FIG. 19 after approximately 235° of rotation of the crankshaft assembly from its initial position illustrated in FIGS. 10 and 12;

FIG. 22 is a partial, side cross-sectional view of a receptacle in accordance with a second embodiment of the present invention and with certain parts broken away for clarity;

FIG. 28 is a partial, elevational view of the end of the receptacle mounted in the vehicle in accordance with the second embodiment of the present invention and having certain parts removed or broken away for clarity;

FIG. 29 is a partial, rear side elevational view of the receptacle mounted in the vehicle in accordance with the second embodiment of the present invention and with certain parts removed or broken away for clarity;

FIG. 30 is a partial, top plan view of the receptacle mounted in the vehicle in accordance with the second embodiment of the present invention and with certain parts removed or broken away for clarity;

FIG. 31 is a partial, left end elevational view of the receptacle mounted in the vehicle in accordance with the second embodiment of the present invention and with certain parts removed;

DETAILED DESCRIPTION OF THE DRAWINGS

Figure 1:
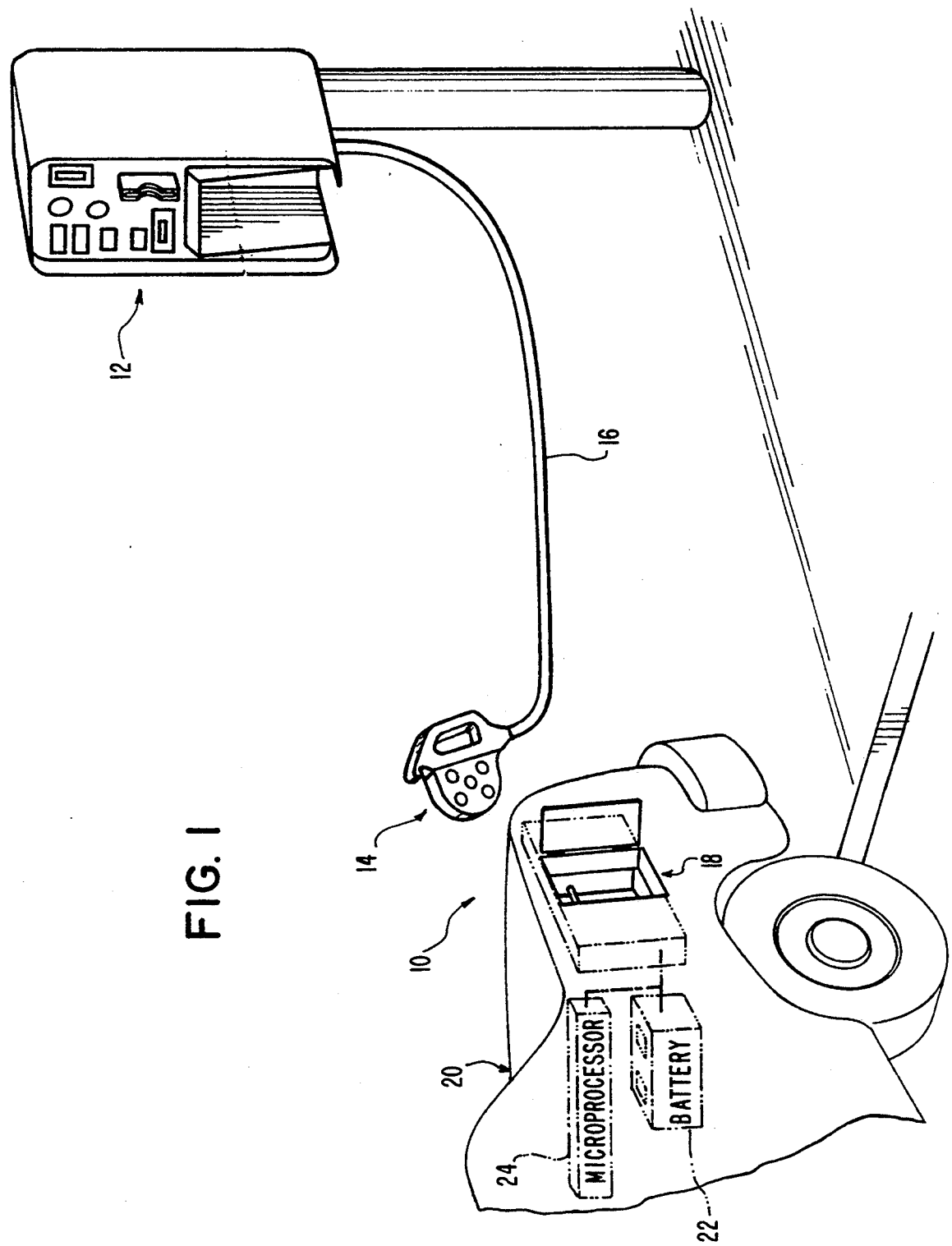
FIG. 1 is a partial perspective view of an electrical connector system in accordance with a first embodiment of the present invention and illustrated in connection with an electric vehicle and an electric recharging station.
Figure 2:
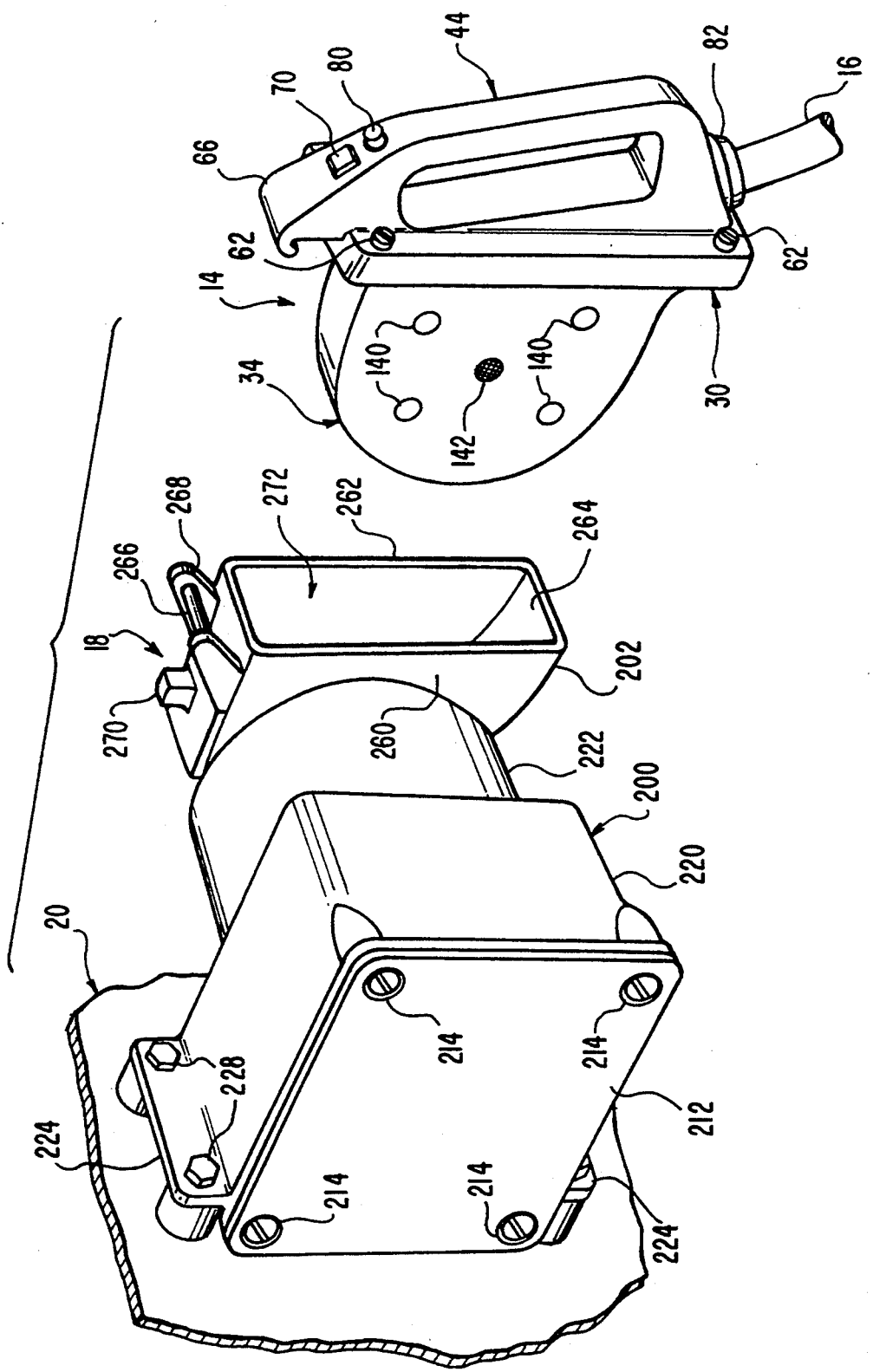
FIG. 2 is an enlarged, partial perspective view of the electrical connector system of FIG. 1.

Referring initially to FIGS. 1-4, an electrical connector system 10 especially designed for use with an electric car or vehicle 20 is illustrated in accordance with the present invention, and includes a power source or charging station 12 for dispensing electrical energy, a plug or male electrical connector 14 electrically coupled to power source 12 by an electrical and communication cable 16, a receptacle or female electrical connector 18 mounted in electric vehicle 20 for receiving electrical energy from plug 14, a battery 22 located in vehicle 20 and electrically coupled to receptacle 18 for receiving electrical energy therefrom, and an on-board microprocessor or computer 24 located in vehicle 20 for transmitting and receiving relevant data to and from power source 12 and to and from receptacle 18 to control the operation thereof.

While plug 14 and receptacle 18 are illustrated in conjunction with an electric vehicle 20, it will become apparent from this disclosure that plug 14 and receptacle 18 can be used in many other electrical systems and applications.

Power source or charging station 12 is preferably connected to the local electrical utility company's power line or to any other conventional source of electrical energy. Charging station 12 can be mounted in practical any location, including residential houses, apartment buildings, gas stations, parking garages, or even at the side of a curb so that power can be readily available to vehicle 20.

In residential applications, charging station 12 can be electrically connected in a conventional manner to a circuit breaker panel or power meter in residential home or apartment. Electrical connections, breaker panel, and/or power meter are all conventional and well known, and thus they will not be discussed or illustrated in detail herein.

In commercial applications, charging station 12 can be constructed to use similar electronics as used in today's automated gas stations. For example, charging station 12 can be provided with a conventional power meter for determining the amount of electrical energy dispensed, a credit or debit card slot for payment of the dispensed electrical energy, and any other of the similar type of conveniences provided at automated gas stations. The electronics and circuits which can be used for operating charging station 12 in commercial applications are conventional and well known, i.e., similar electrical circuits are currently used to operate gas station pumps, and thus the electronics and circuits for charging station 12 will not be discussed or illustrated in detail herein.

Likewise, electric vehicle 20 with battery 22 and microprocessor 24 are all conventional and well known, and thus they will not be discussed or illustrated in detail.

As seen in FIG. 5, cable 16 preferably includes three electrical power conductors 25 and a communication wire 26. Power conductors 25 are all substantially identical to each other, except that one of the conductors 25 is a ground, and the other two conductors 25 are current carrying-conductors.

Each conductor 25 is a conventional conductor with a conductive core and an insulating sheath covering the core. Accordingly, conductors, such as conductors 25, are well known, and thus will not be discussed or illustrated in detail herein.

As seen in FIG. 5, a button contact 28 is fixedly coupled to the one end of each of the conductors 25, while the other end of each of conductors 25 is electrically coupled to power source 12. Contacts 28 can be attached to conductors 25 by a conventional means such as crimping or screws.

Communication wire 26 is a conventional communication wire, and thus will not be discussed or illustrated in detail herein. Communication wire 26 preferably includes a plurality of insulated conductors which are each connected at one end to the electronic circuitry of power source 12 and at the other end to a contact 35 contained in a communication connector 33. Communication connector 33 is a conventional connector with conventional electrical contacts 35 electrically connected to each of the insulated communication wires in a conventional manner. Accordingly, communication connector 33 as well as its contacts 35 will not be illustrated or discussed in detail herein.

Construction of Plug 14

As seen FIGS. 5 and 6, plug 14 includes an insulated connector housing 30 coupled to one end of cable 16 in a weather-tight manner, a contact retainer body 32 removably coupled to housing 30 for housing and maintaining contacts 28 and 35 along a common arcuate or circular path, a contact cover 34 removably coupled to retainer body 32, a molded elastomeric gasket 36 for sealing contact cover 34 to insulated housing 30, a contact shutter disk 38 movably coupled to contact retainer body 32 for selectively covering and exposing contacts 28 and 35, and a latching assembly 40 for selectively locking and unlocking contact shutter disk 38 relative to contact cover 34.

As particularly seen in FIGS. 5 and 6, connector housing 30 of plug 14 has a main body portion 42, a handle portion 44 coupled to the rear face 46 of main body portion 42, a central cable cavity 48 formed in the front face 50 of main body portion 42 for receiving the end of cable 16 therein, an annular groove 52 formed in front face 50 about central cable cavity 48 for receiving gasket 36 therein, a cable receiving bore 56 extending through the bottom end of main body portion 42 and into cable cavity 48 for receiving cable 16 therethrough, an annular peripheral flange or rain shield 58 extending outwardly from front face 50 of main body portion 42, a vertically extending slot 60 formed in front face 50 for receiving a portion of contact retainer body 32 therein, and a hook portion 66 located at the top end of main body portion 42 for engaging a portion of receptacle 18 as discussed below.

Preferably, housing 30 is constructed as an integral, one-piece, unitary member from a hard, rigid non-conductive material such as plastic. Housing 30 of plug 14 is removably coupled to contact cover 34 by four screws 62 (only two shown) which extend through bores 64 of main body portion 42 for threadedly engaging contact cover 34 as discussed below.

Handle 44 can optionally include a charge light 70 for indicating electricity being transmitted therethrough, and a release switch 80 for disconnecting plug 14 from receptacle 18. Charge light 70 and release switch 72 are electrically coupled to conductors 25 and communication wire 26 and controlled by a microprocessor 24 and/or the circuitry of power source 12 in a conventional manner with conventional circuitry. Accordingly, the details of charge light 70 and release switch 72, along with its circuitry, will not be discussed or illustrated in detail herein.

Figure 5A:
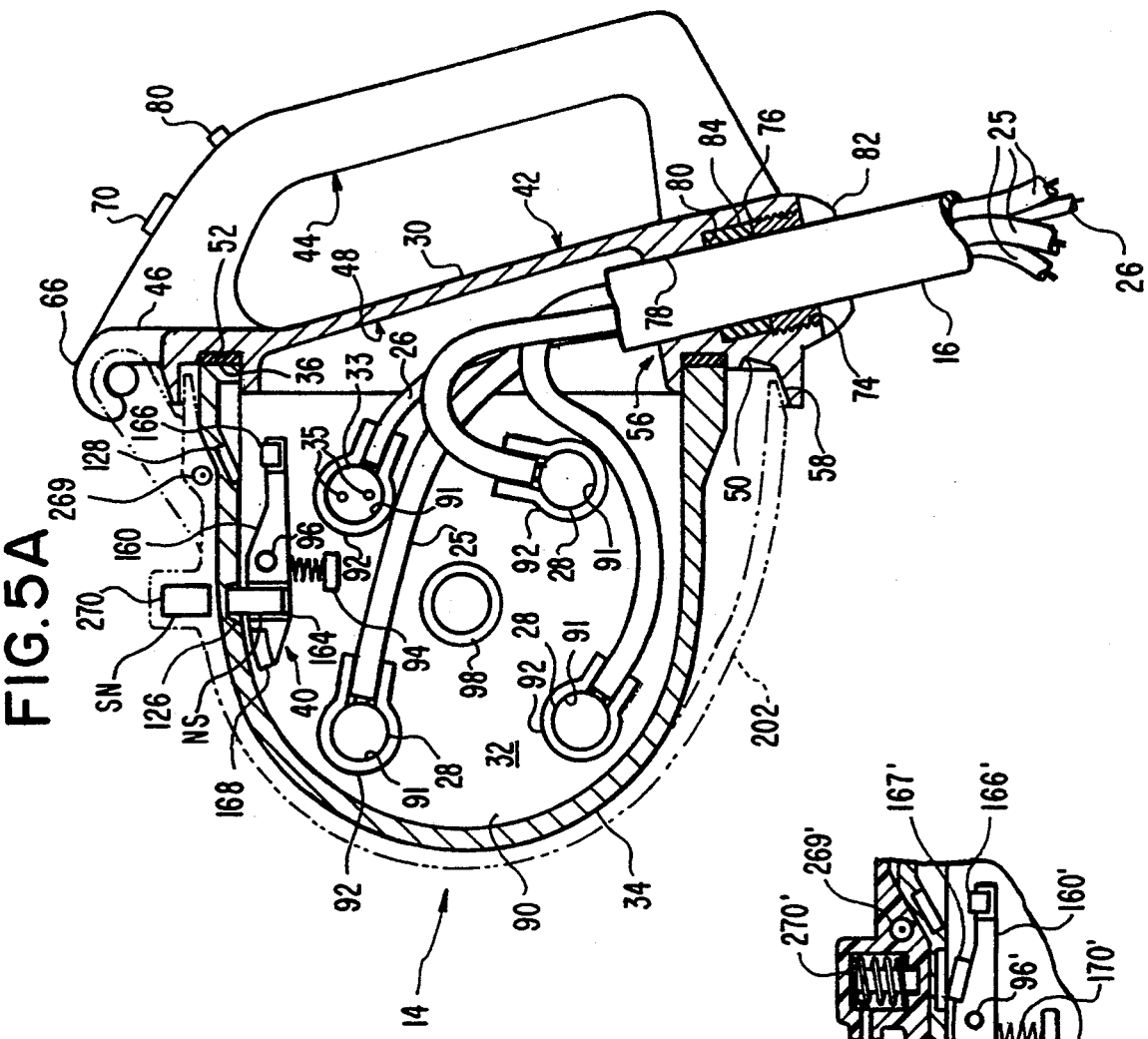
FIG. 5A is a partial cross-sectional view of the plug and receptacle illustrated in FIGS. 1-4, with certain parts removed for clarity.

As seen in FIG. 5A, cable receiving bore 56 has a threaded section 74, a first cylindrical section 76 with a diameter substantially equal to the inner diameter of threaded section 74, and a second cylindrical section 78 with an inner diameter smaller than cylindrical section 76 to form an annular shoulder 80. Cable 16 is secured and sealed in cable receiving bore 56 by a threaded clamp nut 82 and an elastomeric sealing bushing 84. Specifically, bushing 84 is received in first cylindrical section 76 and abuts against shoulder 80, while threaded clamping nut 82 is threadedly received in threaded section 74 and engages and compresses bushing 84 against shoulder 80 to form a seal between main body portion 42 and cable 16.

Referring to FIGS. 5A and 6, contact retainer body 32 includes a flat plate or base portion 90, four contact housings 92 extending outwardly from one side of plate portion 90, a ledge 94 fixedly coupled to plate portion 90 and extending outwardly and perpendicularly from plate portion 90, a pivot pin 96 fixedly coupled to plate portion 90 and extending outwardly from plate portion 90 for pivotally retaining a portion of latching assembly 40 thereon, and a centrally located cylindrical sleeve or tubular member 98 fixedly coupled to plate portion 90 and extending outwardly from plate portion 90. Contact retainer body 32 also has a U-shaped shelf 100 formed along its curved edge for engaging a portion of contact cover 34 and a wedge-shaped shelf 102 extending across the flat edge of plate portion 90 for being received in slot 60 of connector housing 30.

As seen in FIG. 5A, each of contact housings 92 are integrally formed with plate portion 90, and has a circular recess 91 for receiving one of the contacts 28 or connector 33 therein. Preferably, contacts 28 and connector 33 are fixedly retained in their respective recesses 91 of contact housings by friction or and adhesive or any other suitable means. Contact housings 92 are evenly spaced on a common pitch circle diameter or circular path.

As seen in FIG. 6, contact cover 34 is preferably constructed as an integral, one-piece, unitary member from a hard, rigid non-conductive material such as plastic. Contact cover 34 includes a first end wall 110, a second end wall 112, a curved side wall 114 inner connecting first and second end walls 110 and 112, and a rectangular open end 116. First and second end walls 110 and 112 are substantially parallel and somewhat semi-circular in elevational view and forms a cavity 118 with curved side wall 114.

First end wall 110 is substantially planar and has a centrally located opening 120 and four peripheral openings 122 arranged along the circumference of a common circle. Preferably, the edges of first end wall 110 forming openings 120 and 122 are frustoconical as seen in FIG. 4.

The interior surface of side wall 114 includes a groove 124 extending along a U-shaped path adjacent second end wall 112. Groove 124 is sized to receive first shelf 100 of contact retainer body 32 for preventing movement of contact retainer body 32 within cover 34. As seen in FIG. 5A, side wall 114 also includes a pair of recesses 126 and 128 for accommodating portions of latching assembly 40 as discussed below.

Figure 4:
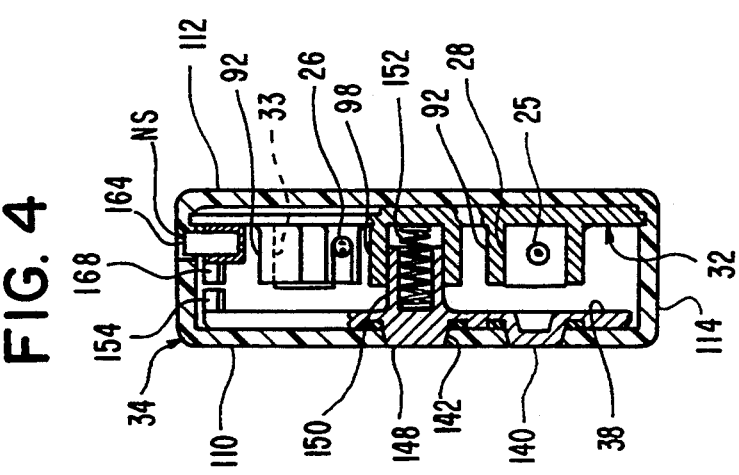
FIG. 4 is a cross-sectional view of the plug illustrated in FIG. 3A taken along section line 4—4.

As seen in FIG. 4, contact cover 34 also includes four threaded bores 131 adjacent each of the four corners of rectangular open end 116 for threadedly receiving screws 64 therein to fasten cover 34 to housing 30.

Gasket 36 is constructed of a resilient, elastomeric material for creating a seal between connector housing 30 and contact cover 34. Gasket 36 is preferably a substantially rectangular, annular ring with an opening 130 in each of its four corners for receiving one of the screws 64 through each one of the openings 130.

As seen in FIG. 6, contact shutter disk 38 is a substantially circular disk having a first face 134 and a second face 136 with four equally spaced circular apertures 138 (only three shown) extending therethrough between first and second faces 134 and 136. Apertures 138 are arranged in a circular path which allows apertures 138 to align with openings 122 when contact shutter disk 38 is rotated in a position to expose contacts 28 and 35.

First face 134 includes four contact shutter pads 140 arranged along a common arcuate or circular path, and a centrally located drive disk shutter pad 142.

Contact shutter pads 140 and drive disk shutter pad 142 are all substantially identical, and are substantially frustoconically shaped projections. An annular groove 144 is concentrically located about the base of each of the shutter pads 140 and 142 for receiving an O-ring seal 146 therein. Contact shutter pads 140 and drive disk shutter pads 142 are arranged on first face 134 so that they may be selectively received within openings 122 and central opening 120, respectively. O-ring seals 146 contact the interior surface of first end wall 110 to create a weather-tight seal therebetween for preventing the ingress of moisture and other contaminants.

Drive disk shutter pad 142 has a stippled, ridge or otherwise rough surface 148 on its free end for rotating contact shutter disk 38 as discussed below. Of course, it will be apparent to those skilled in the art that stippled surface 148 could be provided with a screwdriver type slot for rotating contact shutter disk 38.

As seen in FIGS. 4 and 6, second face 136 has a centrally located sleeve or tubular member 150 extending perpendicularly outwardly from second face 136. Sleeve 150 is rotatably received within sleeve 98 of contact retainer body 32. A compression spring 152 is received in sleeves 98 and 150 to bias contact shutter disk 38 away from contact retainer body 32 and against first end wall 110 of cover 34. Specifically, one end of compression spring 152 is received in sleeve 150, while the other end of compression spring 152 is received in sleeve 98 of contact retainer body 32. Accordingly, contact shutter pads 140 and drive disk shutter pad 142 of contact shutter disk 38 are maintained within opening 122 and 120, respectively, of first end wall 110 of contact cover 34. Moreover, spring 152 compresses O-ring seals 146 against first end wall 110 to create a weather-tight seal to prevent the ingress of moisture and other contaminants from entering plug 14 through openings 120 and 122 as seen in FIG. 4.

Second face 136 also includes a locking tang 154 extending substantially perpendicularly outwardly from the peripheral edge of second face 136. Locking tang 154 is designed to engage latching assembly 40 to prevent rotation of shutter disk 38 until latching 40 is activated to permit such rotation.

Referring to FIG. 5A, latching assembly 40 includes a latching lever 160 is pivotally mounted on pivot pin 96 of contact retainer body 32 by a centrally located hole 162, a first magnet 164 rigidly coupled at one end of lever 160, a second magnet 166 rigidly coupled at the other end of lever 160, a stop shelf 168 adjacent the first end of the lever 160 adjacent first magnet 164, and a compression spring 170 supported on ledge 94 and engaging the first end of lever 160 for biasing lever 160 in a clockwise direction as seen in FIG. 5A.

Spring 170 biases latching lever 160 about pivot pin 96 in a clockwise rotation so that first magnet 164 normally abuts against the interior surface of side wall 114 of cover 34, while second magnet 166 is spaced inwardly from the interior surface of side wall 164 of cover 34. Moreover, specifically first magnet 164 rests in recess 126 of side wall 114, while second magnet 166 is received in recess 128 of side wall 114 upon rotation of latching lever 160 in a counter-clockwise direction. As seen in FIG. 4, in its normal rest position, latching lever 160 maintains stop shelf 168 adjacent locking tang 154 of contact shutter disk 38 to prevent contact shutter disk 38 from rotating or otherwise moving to expose contacts 28 and 35 until plug 14 is inserted into receptacle 18 as discussed below.

Figure 5B:
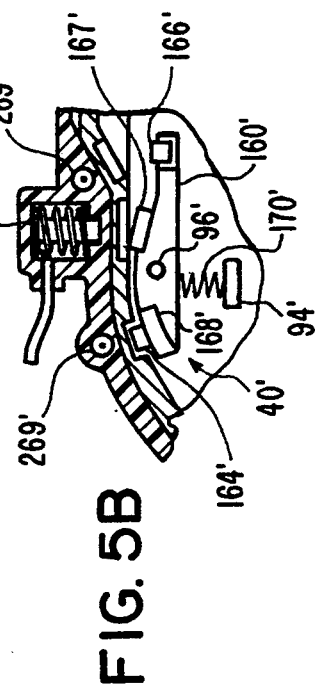
FIG. 5B is a partial cross-sectional view of the plug with a modified latching assembly.

Referring to FIG. 5B, an alternate latching assembly 40' is illustrated, and includes a latching lever 160' pivotally mounted on pivot pin 96', a first magnet 164' rigidly coupled at one of lever 160', a second magnet 166' rigidly coupled at the other end of lever 160', a third magnet 167' rigidly coupled to lever 160' on the right side of pivot pin 96', a stop shelf 168' rigidly coupled to lever 160' adjacent magnet 164, and a compression spring 170' supported on ledge 94' for engaging lever 160' to bias lever 160' in a clockwise direction. Latching assembly 40' and its associated parts operate in substantially the same manner as latching assembly 40 to prevent contact shutter disk 38 from rotating to expose contacts 28 and 35 until plug 14 is inserted into receptacle 18 as discussed below in more detail.

Construction of Receptacle 18

Referring now to FIGS. 7-9, receptacle 18 is electrically coupled to battery 22 of vehicle 20 by electrical power conductors 201 and electrically coupled to microprocessors 24 by electrical communication wire 203. Receptacle 18 includes a drive and contact casing 200 rigidly mounted to vehicle 20, a connector pocket 202 rigidly coupled to drive contact casing 200 and adapted to receive plug 14 therein, a contact assembly 204 contained within drive contact casing 200, a contact shutter disk or cover 206 for covering the contacts of receptacle 18, and a contact and shutter disk control assembly 208 for selectively rotating contact shutter disk 206 from a closed position concealing contacts 205 and 207 to an open position exposing contacts 205 and 207, and for electrically connecting the contacts 205 and 207 of receptacle 18 to the contacts 28 and 35 of plug 14.

Drive and contact casing 200 is preferably constructed of an insulated, nonconductive material such as a rigid plastic, and includes a tubular side wall 210 releasably mounted to vehicle 20, a first end wall 212 removably coupled to side wall 210 via screws 214, and a second end wall 216 integrally formed with side wall 210 and extending substantially parallel to first end wall 212.

Tubular side wall 210 preferably includes a first tubular section 220 with a rectangular transverse cross section and a second tubular section 222 with a circular transverse cross section. First and second tubular sections 220 and 222 are integrally formed and concentrically mounted together. First tubular section 220 has a pair of mounting flanges 224 with a pair of holes 226 in each of the mounting flanges 224 for receiving screws 228 for fixedly coupling casing 200 to vehicle 20.

A shoulder 230 is formed at the intersection of tubular sections 220 and 222, and has four threaded bores 236 for receiving screws 238 therein for securing a portion of contact assembly 204 thereto.

First end wall 212 is substantially a flat planar plate constructed of a substantially rigid, nonconductive material such as plastic. First end wall 212 is removably coupled to first tubular section 220 for accessing the various parts of receptacle 18 contained therein. Specifically, the free edge of first tube 220 has four threaded bores 232 for threadedly receiving screws 214. A resilient, elastomeric gasket 234 is positioned between first end wall 212 and the edge of first tubular section 220 for creating seal therebetween to prevent the ingress of moisture and other contaminants into casing 200. First end wall 212 includes four apertures 240 for receiving one of the screws 228 through each of the apertures 240 for securing first end wall 212 to side wall 210.

Second end wall 216 is preferably integrally formed with second tubular section 222. Second end wall has an exterior face 242 with four threaded bores 244 formed therein, and an interior face 246 with four contact guide tubes 248 arranged in a circular path and a centrally located control shaft guide tube 250.

Four contact openings 252 extend through second end wall 216 between exterior face 242 and interior face 246. Contact opening 252 are concentrically aligned with guide tubes 248. A centrally located control shaft opening 254 extending between exterior face 242 and interior face 246 and axially aligned with control shaft guide tube 250. Guide tubes 248 and 250 support a portion of the contact assembly 204 as discussed below.

As seen in FIG. 7, connector pocket 202 has first and second, opposed, end walls 260 and 262, a curved side wall 264 extending between first and second end walls 260 and 262, a trunnion pin 266 mounted to the top of side wall 264 by a pair of flanges 268, a reed switch 269 mounted in the upper portion of curved side wall 264, and a magnet 270 mounted in the upper portion of curved side wall 264.

Preferably walls 260, 262 and 264 are all molded as a unitary, integrally formed, one-piece member from a nonconductive, insulating material such as plastic. End walls 260 and 262 are substantially parallel with curved side wall 264 extending perpendicularly therebetween to form a connector cavity 272 with a front opening 274 for receiving contact cover 34 of plug 14 through opening 274 and into cavity 272.

First end wall 260 is provided with four mounting holes 276 for receiving screws 278 therethrough, which in turn are threadedly received in threaded bores 244 of second end wall 216 of casing 200 for rigidly securing connector pocket 202 to casing 200. Preferably, an elastomeric, resilient gasket 280 is positioned between casing 200 and connector pocket 202 for creating a weather-tight seal therebetween in a conventional manner. First end wall 260 also includes a large circular opening 282 for rotatably receiving contact shutter disk 206 therein.

As seen in FIGS. 3A and 3B, pin 266 is adapted to hook portion 66 of plug 14 for maintaining and positioning plug 14 within connector pocket 202 so that the contacts of plug 14 align with the contacts of receptacle 18. Thus, this hook portion 66 of plug 14 and pin 266 of receptacle 18 ensure that plug 14 is always correctly positioned within cavity 272 of connector pocket 202.

Magnet 270 is a conventional magnet which is fixedly coupled within the upper portion of curved side wall 264 of connector pocket 202. Magnet 270 has a north pole and a south pole with its north pole being oriented downwardly towards cavity 272. When plug 14 is fully inserted into cavity 272 of connector pocket 202 of receptacle 18, magnet 270 of connector pocket 202 will be positioned adjacent first magnet 164 of latching assembly 40 of plug 14. Magnet 164 of latching assembly 40 has its north pole oriented upwardly. Thus, magnet 164 and magnet 270 have opposite polarities, i.e., their north poles face each other, causing magnets 270 and 164 to repel each other when brought together.

Accordingly, when plug 14 is fully inserted into cavity 272 of receptacle 18 as seen in FIG. 5A, fixed magnet 270 of receptacle 18 will repel the movably magnet 164 of plug 14 causing magnet 164 to move away from magnets 270. This movement of magnet 164 will cause latching lever 160 to pivot about pivot pin 96 against the force of compression spring 170, until second magnet 166 of plug 14 contacts side wall 164 of connector pocket 202. Second magnet 166 is then positioned adjacent reed switch 269 to activate contact and shutter disk control assembly 208 via the microprocessor 24. Also, stop shelf 168 has now been moved out of the way of locking tang 154 to allow shutter disk 38 of plug 14 to move inwardly and rotate.

When plug 14 is removed from receptacle 18, compression springs 170 will pivot latching lever 160 back about pivot pin 96 until first magnet 164 again contacts the interior surface side wall 164 of connector pocket 202.

In the alternate embodiment illustrated in FIG. 5B, connector pocket 202 is provided with an electromagnet 270' and a pair of reed switches 269' which are activated by magnets 164' and 166'. In particular, when magnet 164' of plug 14 is adjacent the first reed switch 169', microprocessor 24 activates electromagnet 260' so as to rotate lever 160'. Then, magnet 166' is moved adjacent the second reed switch 169' to activate cover and shutter disk control assembly 208 via microprocessor 24 in the same manner as the first embodiment.

Referring now to FIGS. 9A and 9B, contact assembly 204 includes three electrical power contact pins 290 (only one shown in FIG. 9B) slidably engaging bushing contacts 205, a communication contact pin 292 housing a pair of communication contacts 207 therein, a contact pin guide housing 294 for supporting brush contacts 205 and slidably engaging contact pins 290 and 292, a set of four cylindrical seal carriers 296 (only one shown in FIG. 9B) with each being received in one of the contact guide tubes 248, a first set of four compression springs 297 (only two shown in FIG. 9B) with each being received on one of the contact pins 290 or 292 for maintaining contact pins 290 and 292 in position, and a second set of four compression springs 298 (only one shown in FIG. 9B) with each being received about one of the contact pins 290 or 292 and engaging one of the seal carriers 296.

As seen in FIGS. 9A and 10, contact guide housing 294 has a substantially rectangular base plate 300, three power contact bores 302, three cylindrical contact sleeves 304 concentrically mounted about contact bores 304 for receiving and retaining tubular brush contacts 205 therein, a rectangular communication bore 306 for receiving communication contact pin 292 therein, a communication contact sleeve 308 concentrically mounted about communication bore 306 for slidably receiving communication contact pin 292 therein, a centrally located control shaft bore 310 with a stepped sleeve 312 concentrically mounted therewith, and a pair of mounting pillars 314 for coupling a portion of contact and shutter disk control assembly 208 thereto.

Base plate 300 of contact guide housing 294 has four circular apertures 320 with one of circular aperture 320 being located at each corner of base plate 300 for receiving a screw 238 therethrough. Accordingly, screws 238 fixedly couples contact guide housing 294 to casing 200.

Contact sleeves 304 receive brush contacts 205 therein which in turn slidably supports contact pins 290. Each of the contact sleeves 304 has a U-shaped cutout portion 322 for allowing ingress of the electrical conductor 201, and a threaded bore 324 for receiving a set screw 326 for fixedly securing brush contacts 205 therein. Brush contacts 205 can be provided with a counterbore 328 for receiving the tip of screws 326 therein.

Communication contact sleeve 308 is substantially identical in construction to power contact sleeves 304 except for sleeve 308 has a rectangular cross section for accommodating the rectangular shape of communication contact 207. Thus, communication contact sleeve 308 will not be discussed or illustrated in detail.

Mounting pillars 314 extend substantially perpendicularly from base plate 300 and are vertically spaced or base plate 300. Each of the mounting pillars 314 has a clamp block 334 secured to its free end via a pair of screws 336 in a conventional manner. Accordingly, a portion of contact and shutter disk control 208 is fixedly secured within casing 200 as discussed below.

As seen in FIGS. 9B and 10, metallic contact pins 290 are preferably made of a highly conductive metallic material, and each has a first cylindrical portion 340 with a diameter slightly smaller than the inner diameter of bushing contacts 205, and a second cylindrical portion 342 with a diameter larger than the diameter of the first cylindrical portion 340 to form an annular shoulder 344 therebetween. Cylindrical portion 340 has a pair of annular grooves 346 for receiving C-clips or retaining rings 348 therein for connecting pin 290 to contact and shutter disk control 208 as discussed below.

Communication contact pin 292 has a substantially rectangular portion 350, a first cylindrical portion 352, and a second cylindrical portion 354 with a diameter slightly larger than first cylindrical portion 352 to form an annular shoulder 356. The communication wire 203 enters through the rectangular portion 350 and extends through first cylindrical portion 352 and second cylindrical 354 where it terminates with conventional pin connectors 207.

First cylindrical portion 352 has a pair of annular grooves 360 for receiving C-shaped clips or retaining rings 348 for coupling communication contact pin 292 to contact and shutter disk control assembly 208 as discussed below.

As seen in FIGS. 9B and 10, seal carriers 296 are substantially tubular members having a first end 368, a second end 370, an outer cylindrical surface 372 and an inner cylindrical, stepped bore 374.

As seen in FIG. 10, first end 368 is stepped to form an annular shoulder 376 for supporting one end of compression spring 298 thereon. Second end 370 has an annular groove 378 for receiving an O-ring seal 380 for creating a face seal between seal carrier 296 and shutter disk 206. O-ring seal 380 also creates a seal between seal carrier 296 and contact housing 34 of plug 14 to prevent the ingress of moisture or other contaminants from contacting the contacts. Outer cylindrical surface 372 has an annular groove 382 for receiving an elastomeric O-ring seal 384 for sealing the interface between outer surface 372 and the inner surface of contact guide tube 248.

Stepped bore 374 preferably includes a first cylindrical portion 390 sized to slidably receive first cylindrical portion 340, and a second cylindrical portion 392 sized slidably to receive second cylindrical portion 342 of contact pin 290. First and second cylindrical bore portions 390 and 392 formed an abutment surface 394 for engaging shoulder 344 of pin 290 or pin 292 so that seal carrier 296 can be pulled away from contact shutter disk 206 by either pin 290 or pin 292.

As seen in FIG. 7, contact shutter disk 206 has a substantially flat circular plate portion 400 with four holes 402 extending therethrough and arranged along a circular path, a central hole 404, and a sleeve 406 concentrically mounted about central hole 404 and extending substantially perpendicular from plate portion 400. Sleeve 406 is substantially cylindrical with an annular groove 408 for receiving an O-ring seal 410 therein. Sleeve 406 is rotatably received within control shaft guide tube 250 of casing 200 with O-ring seal 410 engaging the inner surface of guide tube 250 to prevent the ingress of moisture as seen in FIG. 10.

As seen in FIG. 10, a pair of pins 420 are fixedly coupled to the interior of sleeve 406 of contact shutter disk 206. Preferably, pins 420 are spaced 180° apart and extend radially inwardly towards the center of sleeve 406. Pins 420 engage contact and shutter disk control assembly 208 for rotating contact shutter disk 206.

As seen in FIGS. 9A and 10, contact and shutter disk control assembly 208 includes a drive motor 430, a crankshaft assembly 432 operatively coupled to drive motor 430, a shutter control shaft 434, a contact bail 436 and a pair of drive links 438 operatively coupling crankshaft assembly 432 to contact bail 436. Reed switch 269 fixedly coupled within connector pocket 202 of receptacle 18 activates control assembly 208 via microprocessor 24, upon full insertion of plug 14 into connector pocket 202 of receptacle 18.

Motors such as drive motor 430 are conventional and well known in the art, and thus drive motor 430 will not be discussed or illustrated in detail herein. Drive motor 430 preferably has an internal gear reduction (not shown) and a drive or output gear 444 rotatably coupled to the output shaft (not shown) of motor 430. Drive gear 444 is driven by motor 430 in both the clockwise and counter-clockwise directions for at least approximately 235° of rotation. Motor 430 is electronically coupled to and controlled by microprocessor 24, which in turn is electrically coupled to reed switch 269 and communication wire 203. Motor 430 is fixedly coupled to the interior of casing 200 in a conventional manner via screws 431 as seen in FIG. 8.

As seen in FIG. 9A, crankshaft assembly 432 includes a crankshaft 446 rotatably mounted within casing 200 via pillars 314, a gear 448 fixedly coupled to one of crankshaft 446 for engaging drive gear 444, an upper crank pin 450 extending upwardly from gear 448, a crank arm 452 fixedly coupled to the other end of crankshaft 446, a lower crank pin 454 extending downwardly from crank arm 452, and a rise and lift cam 456 fixedly coupled to the center of crankshaft 446. Crank pins 450 and 454 each has an annular groove 460 for receiving a C-clip or a retaining ring 462 therein for rotatably coupling one end of drive links 438 thereto.

As seen in FIGS. 10–21, rise and lift cam 456 has a control groove 470 for engaging shutter control shaft 434 to rotate shutter control shaft 434 as well as translate shutter control shaft 434 along its longitudinal axis. Control groove 470 has a first section 470a extending substantially horizontally and increasingly moving away from its center of rotation, a second section 470b extending downwardly at about a 30° to 45° angle from first section 470a and maintaining an equal distance from its center of rotation therealong, and a third section 470c extending substantially horizontally from second section 470b and maintaining an equal distance from its center of rotation.

As seen in FIGS. 10 and 12, shutter control shaft 434 has a crank arm 472 with a crank pin 474 fixedly coupled at one end and a stippled, ridged or otherwise rough surface 476 at its other end for engaging the stippled surface 148 of drive disk shutter pad 142.

Shutter control shaft 434 also includes a first annular groove 480 for receiving an elastomeric O-ring seal 482 therein, a pair of slots 484 for receiving pins 420 of shutter disk 206, and a second annular groove 486 for receiving a C-clip or retaining ring 488.

Annular groove 480 with O-ring seal 482 is located adjacent stippled end 476 and maintained within sleeve 406 of shutter disk 206.

Slots 484 are located a quarter of a length of control shaft 434 away from stippled end 476 and receive pin 420 of shutter disk 206 so that shutter disk 206 rotates with crank shaft 434. Slots 484 are approximately 180° apart on shutter control shaft 434 and engage pins 420 of contact shutter disk 206 for permitting limited reciprocating motion of control shaft 434 relative to shutter disk 206 and for rotating shutter 206 therewith.

As seen in FIG. 10, second annular groove 486 with clip 488 is positioned between slots 484 and crank arm 472 for abutting against guide housing 294 to limit axial movement of control shaft 434.

A compression spring 490 is positioned between crank arm 472 and contact guide housing 294 for biasing crank pin 474 into contact with control groove 470.

Referring to FIGS. 10-21, crank pin 474 received within control groove 470 rise and lift cam 456 for controlling both the rotational and linear movement of control shaft 434. In particular, as cam 456 rotates, crank pin 474 will engage first section 470a of control groove 470 for about 55° of rotation causing control shaft 434 to move axially without rotation for engaging shutter pad 142. Control shaft 434 is moved axially by a distance "Y" which causes shutter pads 140 and 142 to disengage from openings 120 and 122. Next, crank pin 474 enters second section 470b of control groove 470 as cam 456 continues to rotate for about 55°. Second section 470b of control groove 470 causes control shaft 434 to rotate, which in turn rotates shutter disks 38 and 206 simultaneously so that openings 220 and holes 402 are axially aligned with each other as well as with contact pins 290 and 292. During the last 125° of rotation of cam 456, crank pin 474 rides along third section 470c of control groove 470 which neither rotates nor linearly translates control shaft 434 in any direction.

As seen in FIGS. 9A and 10, molded contact bail 436 is substantially rectangular in elevational view, and includes a pair of trunnion pins 492 extending in opposite directions along a vertical axis for receiving one end of drive links 438 thereon, a set four stepped contact holes 494 for slidably receiving contact pins 290 and 292 therein, a central control shaft hole 496 for allowing control shaft 434 to pass freely therethrough, and a set of four concentric circular grooves 498 surrounding each one of the stepped contact holes 494 for receiving one end of compression springs 298 therein.

Trunnion pins 492 each includes an annular groove 500 for receiving a C-clip or retaining ring 502 for retaining drive links 438 thereon.

Drive links 438 are substantially elongated flat links with a pair of pivot holes 504 at each end with one of the pivot holes 504 receiving one of the crank pins 150 or 154 and the other pivot hole 504 receiving one of the trunnion pins 492.

Operation of Electrical Connector System 10

During normal operation, plug 14 has its electrical contacts completely covered by cover 34 and contact shutter disk 38 prior to insertion into connector cavity 272 of receptacle 18, while the contacts of receptacle 18 are completely concealed by casing 200 and contact shutter disk 206. Thus, inadvertent contact with either the electrical contacts of plug 14 or receptacle 18 by the user is prevented, as well as the ingress of water or contaminants.

As seen in FIGS. 3A and 3B, plug 14 is inserted into connector cavity 272 of receptacle 18 by first engaging hook portion 66 of plug 14 on pivot pin 266 of connector pocket 202, and then swinging plug 14 downwardly into connector cavity 272. Cavity 272 is sized to receive cover 34 of plug 14 therein with little or no hand force by the user to insert plug 14 into receptacle 18. Hook portion 66 of plug 14 and pin 266 of receptacle 18 insure that plug 14 is always correctly positioned within cavity 272 of connector pocket 202.

When plug 14 is fully inserted into cavity 272 of connector pocket 202, as seen in FIG. 5A, fixed magnet 270 of receptacle 18 will be positioned adjacent magnet 264 of latching assembly 40 of plug 14. Magnet 164 of latching assembly 40 has its north pole oriented upwardly, while magnet 270 has its north pole oriented downwardly. Accordingly, fixed magnet 270 of receptacle 18 will repel the movable magnet 164 of plug 14 downwardly causing magnet 164 to move away from magnet 270. This movement of magnet 164 will cause latch lever 160 to pivot about pivot pin 96 against the force of compression spring 170, until second magnet 166 of latching assembly 40 contacts side wall 114 of contact cover 34. Also, second magnet 166 is then positioned adjacent reed switch 269 to activate contact and shutter disk control assembly 202 via microprocessor 24 and stop shelf 168 is now out of the way of locking tang 154 to allow shutter disk 38 of plug 14 to move inwardly and rotate.

The contact closure of reed switch 269 signifies that plug 14 is correctly positioned within connector pocket 202 and that the shutter disk 38 is unblocked and free to be pushed in and rotated.

The on board microprocessor 24 recognizes the closure of reed switch 269 and then drives motor 430 to activate contact and shutter disk control assembly 208.

In particular, drive motor 430 rotates drive gear 444 which in turn rotates gear 448 of crankshaft assembly 432. Rotation of gear 448 rotates crankshaft 446 to rotate along with cam 456 and crank arm 452.

During the first 55° of rotation of crank shaft 446, drive links 438 pull bail 436 to the left, which in turn pulls contact pins 290 and 292 to the left since right clip 362 engages bail 436. Since there is a space between the abutment surfaces 394 of seal carriers 296 and the shoulders 344 and 356 of pins 290 and 292, respectively, the first 55° of rotation of crankshaft 446 will not move seal carriers 296 until shoulders 344 and 356 of pins 290 and 292 engage abutment surfaces 394 of seal carriers 296. At that point the continued leftward translation of pins 290 and 292 move the seal carriers 296 to the left with pins 290 and 292. Thus, O-ring seals 380 are moved off of the sealing areas of contact shutter disk 206. It is important that the space between abutment surfaces 394 of seal carriers 296 and shoulders 344 and 356 of pins 290 and 292 is sufficient to ensure that seals 380 are independently seated against the sealing areas of shutter disk 206 without the interference of pins 290 and 292.

Also, during the first 55° of rotation of crankshaft 446, cam 456 is rotated to translate control shaft 434 to the right at the same time as pins 290 and 292, seal carriers 296 and bail 436 are moved to the left. Since plug 14 is inserted into connector cavity 272, stop shelf 168 has been moved out of the way of locking tang 154 so that control shaft 434 can move shutter disk 38. Accordingly, control shaft 434 is moved axially causing shutter pads 140 and 142 to disengage from openings 120 and 122 of contact housing 34. During this first 55° of rotation of crank shaft 446, no rotation of shutter disks 38 or 206 has taken place.

During the next 55° of rotation of the crankshaft 446, bail 436 is moved back to its starting point, while seal carriers 296 projects partly into holes 402 of shutter disk 206 due to compression springs 298. Simultaneously, cam 456 has also rotated 55° causing control shaft 434 to rotate, which in turn rotates both shutter disks 38 and 206.

During the initial 55° of rotation of crankshaft 446, the seal carriers 296 with seals 380 were pulled back away from the face of shutter disk 206 so that control shaft 434 can freely rotate shutter disks 38 and 206 without engaging seal carriers 296 during the second 55° of rotation of crankshaft 446. In particularly, control shaft 434 is frictionally coupled to connector shutter disk 38 at drive shutter pad 142 and operatively coupled to shutter disk 206 via pins 420 and slots 484 so that both shutter disks 38 and 206 rotate with control shaft 434. The rotation of shutter disk 206 now uncovers openings 252 of casing 200 by aligning holes 402 of shutter disk 206 with openings 252. This rotation of shutter disk 38 aligns openings 122 of housing 34 with openings 138 of shutter disk 38. Accordingly, the contact pins 290 and 292 of receptacle 18 can now be moved to the right to electrically engage contacts 28 and 35 of plug 14.

During the final 125° of rotation of crankshaft 446, crank pins 150 and 152 move drive links 438 and bail 436 to the right. As bail 436 translates to the right it carriers with it pins 290 and 292 as well as seal carriers 296. The travel of seal carriers 296 is arrested when the seals 380 contact the end wall 110 of the plug 14 around holes 120 of contact housing. Continuing movement of bail 436 to the right causes seals 380 of seal carrier 296 to compress via spring 298 to maintain positive and individual seal pressure at the interface of each seal carrier 296 and end wall 110 of plug 14. During this final 125° of rotation of the cam 456, both linear and rotational displacements of groove 470 remain constant, and hence there is no movement of control shaft 434.

The continuing motion of bail 436 brings power contact pins 290 and data contact pin 292 into electrical contact with contact buttons 28 and communication contacts 35 of plug 14. Bail 436 continues to move, but at this point compresses springs 297 to ensure good electrical contact at the interface of contact pins 290 and 292 of receptacle 18 against the contacts 28 and 35 of plug 14.

At this point the mechanical and electrical connection of plug 14 to receptacle 18 has been completed. Communication between microprocessor 24 and recharging station 12 is established through the communication wires, and now signals are processed to energize the power supply circuit. The mechanism returns to its disconnected state by reversing all steps described herein.

Electrical Receptacle 18' with Break-Away and Manual Release Mechanism 600

As seen in FIGS. 22-36, a second embodiment of an electrical receptacle 18' with a break-away and manual release mechanism 600 in accordance with the present invention is illustrated for use in conjunction with plug 14 discussed above. Electrical receptacle 18' is substantially identical to receptacle 18 of the first embodiment illustrated in FIGS. 1-21, except that contact casing 200, connector pocket 202 and crankshaft assembly 432 have been modified to include the emergency break-away and manual release mechanism 600 discussed below. Accordingly, the construction and assembly of receptacle 18' will not be discussed or illustrated in detail herein, except for the differences between receptacle 18 and receptacle 18'.

Figure 23:
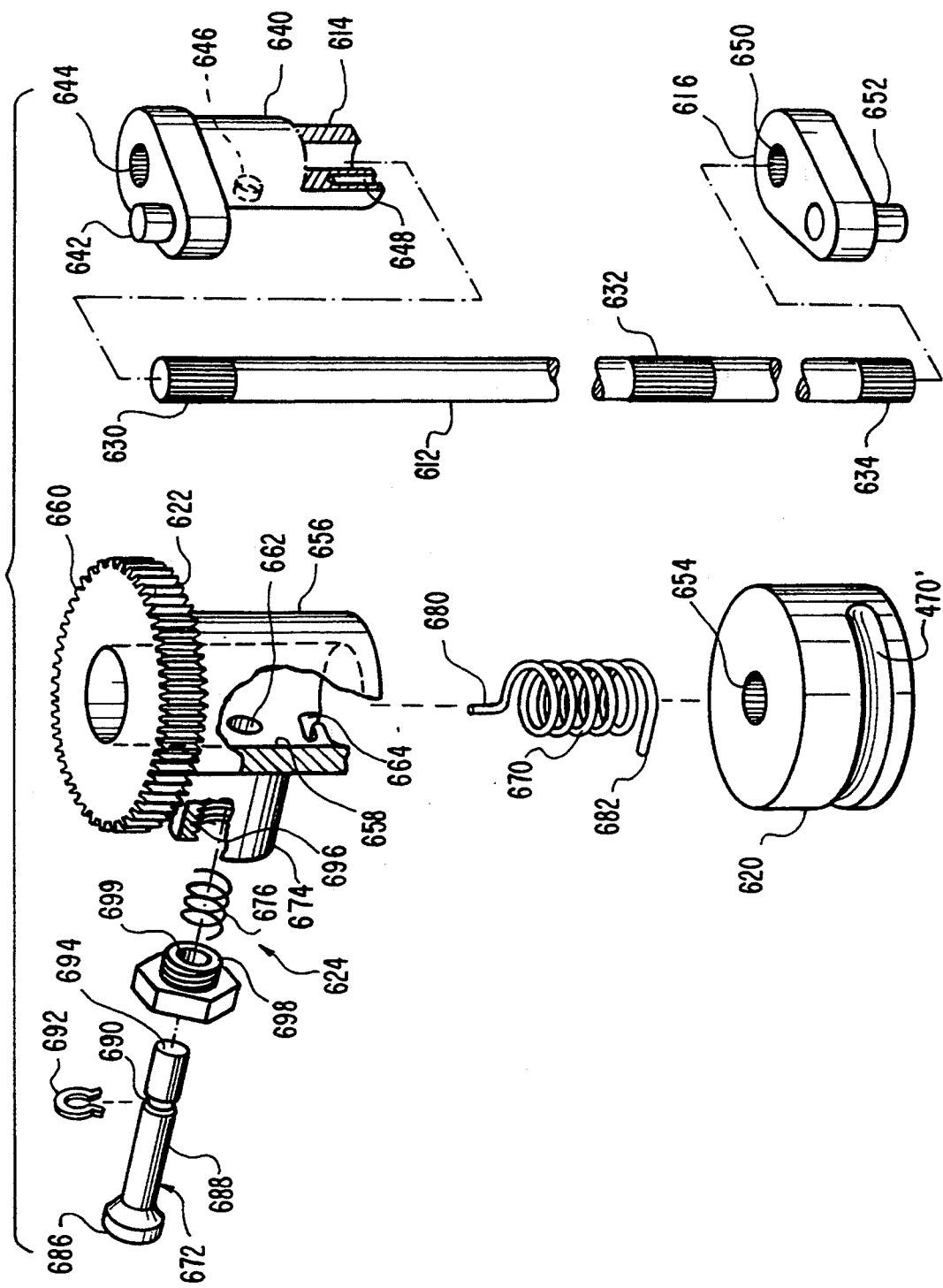
FIG. 23 is an exploded perspective view of the modified crankshaft assembly illustrated in FIG. 22.
Figure 26:
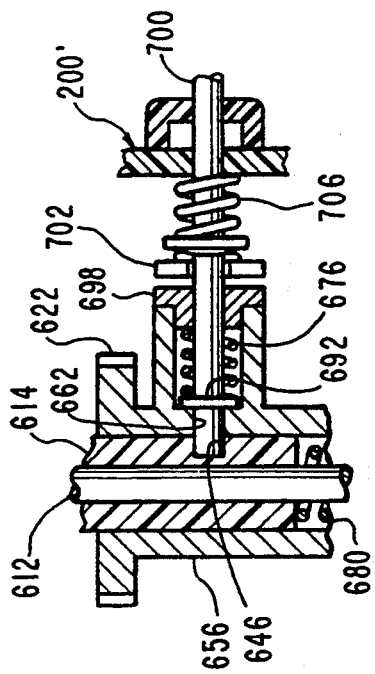
FIG. 26 is a partial, longitudinal cross-sectional view of the receptacle and the crankshaft assembly illustrated in FIG. 25.
Figure 27:
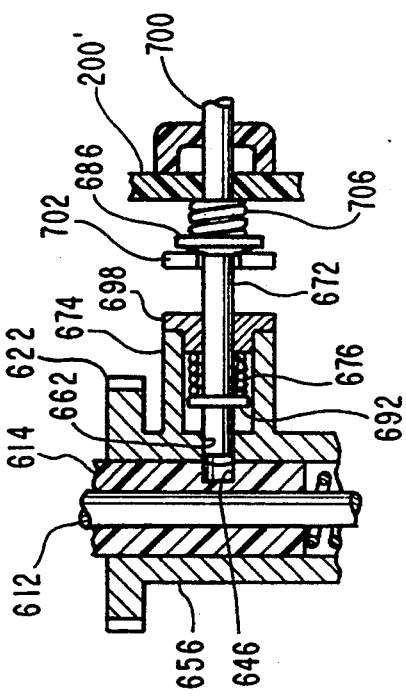
FIG. 27 is a partial, longitudinal cross-sectional view of the receptacle and the crankshaft assembly illustrated in FIG. 26 after a breakaway force has been applied to the cable of the plug and transmitted to the receptacle.
Figure 24:
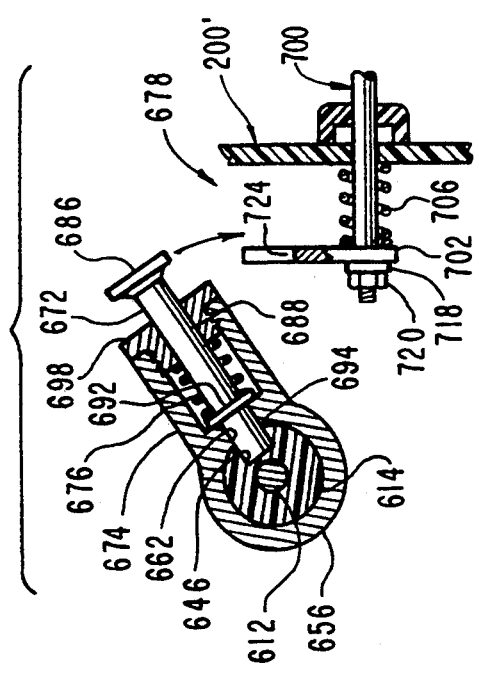
FIG. 24 is a partial, transverse cross-sectional view of the receptacle and the crankshaft assembly of the second embodiment taken along section line 24—24 of FIG. 22 after partial rotation of the crankshaft and with certain parts removed for clarity.
Figure 25:
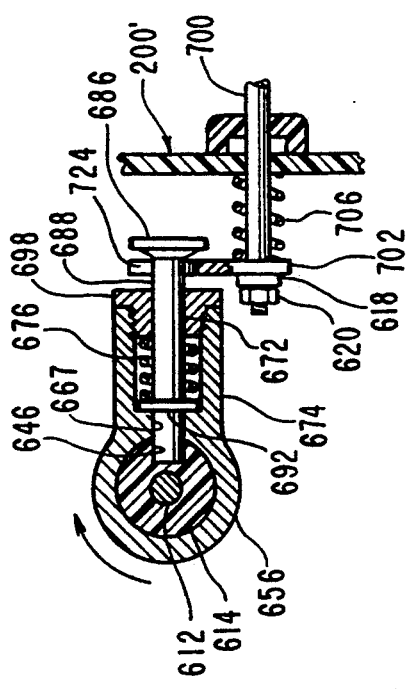
FIG. 25 is a partial, transverse cross-sectional view of the receptacle and the crankshaft assembly illustrated in FIG. 24 after 235° of rotation of the crankshaft from its initial position and with certain parts removed for clarity.

As seen in FIGS. 22 and 23, crankshaft assembly 610 includes a crankshaft 612 rotatably mounted within casing 200', a first or upper crank arm 614 fixedly coupled to crankshaft 612, a second or lower crank arm 616 fixedly coupled to the lower end of crankshaft 612, a rise and lift cam 620 fixedly coupled to the center of crankshaft 612, a drive gear 622 rotatably mounted on crankshaft 612, and a release pin assembly 624 for disconnecting motor 430' and for retracting metallic contact pins 290' and communication connector pins 292' as well as control shaft 434'.

Crankshaft 612 is rotatably coupled to casing 200' via a pair of bushing members 628a and 628b. Crankshaft 612 includes a first splined portion 630 at its upper end for fixedly coupling first crank arm 614 thereto, a second centrally located splined portion 632 for fixedly coupling rise and lift cam 620 thereto, and a third splined portion 634 at the lower end for fixedly coupling second crank arm 616 thereto. Accordingly, rotation of crankshaft 612 causes crank arms 614 and 616, as well as cam 620, to rotate therewith for moving contact pins 290', communication contact pin 292' and control shaft 434' in the same manner as discussed above in the first embodiment.

First crank arm 614 includes a downwardly extending barrel portion 640, and an upper crank pin 642 for engaging upper drive link 438'.

Barrel portion 640 has a centrally located internal bore 644 with a splined portion for fixedly coupling crank arm 614 to crankshaft 612 via an interference fit with first splined portion 630. Barrel portion 640 also has a radially extending locking hole 646 for operably engaging a portion of release pin assembly 624 to lock drive gear 622 to crankshaft 612. The outer surface of barrel portion 640 is preferably cylindrical, and is rotatably received in bushing 628a for rotatably supporting the upper end of crankshaft 612 within casing 200', while the lower end of crankshaft 612 is received within bushing 628b for rotatably supporting the lower end of crankshaft 612 within casing 200'.

Second crank arm 616 includes a splined hole 650 fixedly coupled on third splined portion 634 via an interference fit, and a lower crank pin 652. Lower crank pin 652 is axially aligned with upper crank pin 642, and is coupled to lower drive link 438' in the same manner as discussed above in the first embodiment.

Rise and lift cam 620 includes a splined bore 654 fixedly coupled on second splined portion 632 of crankshaft 612 via an interference fit, and a control groove 470' for engaging and moving shutter control shaft 434' in the same manner as discussed above in the first embodiment. Accordingly, cam 620 will not be discussed or illustrated in detail herein.

Drive gear 622 has a drive gear barrel 656 with a central, vertically extending bore 658 for rotatably receiving barrel portion 640 of first crank arm 614, and a plurality of teeth 660 for operatively engaging the teeth of drive gear 444' of drive motor 430'. Drive gear barrel 656 also includes an axially extending release pin hole 662 and an anchor slot 664, both of which cooperate with portions of release pin assembly 624 as discussed below.

Release pin assembly 624 includes a coil spring 670 coupled between barrel portion 640 of first crank arm 614 and drive gear barrel 656, a release pin 672 for fixedly coupling first crank arm 614 to drive gear 622, a release pin housing 674 for slidably supporting release pin 672, a compression spring 676 for biasing release pin 672 into engagement with locking hole 646 of first crank arm 614 and release pin hole 662 of drive gear 622, and a trigger pin assembly 678 for moving release pin 672 from locking hole 646.

Coil spring 670 is positioned around crankshaft 612, and has its first end 680 received in spring pocket 648 of crank arm 614 and its second end 682 received in anchor slot 664. Accordingly, when first crank arm 614 is rotated relative to drive gear 622, coil spring 670 places a torsional force between first crank arm 614 and drive gear 622.

Release pin 672 is slidably retained within release pin housing 674, and includes a first end with a head portion 686, a shaft portion 688 with an annular groove 690 for receiving a C-clip or retaining ring 692 therein, and a free end 694 which is received in locking hole 646 of first crank arm 614 and release pin hole 662 of drive gear 622. Accordingly, release pin 672 is normally biased by spring 676 to lock drive gear 622 to first crank arm 614 so that drive gear 622 operatively engages and rotates crankshaft 612. However, retraction of release pin 672 from locking hole 646 of crank arm 614 by trigger pin assembly 678 allows crank arm 614 and crankshaft 612 to freely rotate within bore 658. Moreover, coil spring 670 drives crankshaft 612 to retract contact pins 290' and 292', as well as control shaft 434'.

Release pin housing 674 is fixedly coupled and preferably integrally formed with drive gear barrel 656. Release pin housing 674 preferably includes a partially threaded bore 696 with a retaining nut 698 threadedly received within threaded bore 696 for compressing spring 676 within bore 696 to bias release pin 672 inwardly into locking hole 646. Specifically, retaining nut 698 has a centrally located bore 699 for slidably receiving release pin 672 therein and for compressing spring 676 between clip 692 of release pin 672 and retaining nut 698. Accordingly, compression spring 676 biases against clip 692 radially inwardly to move release pin 672 into locking hole 646 of crank arm 614 to lock drive gear 622 to crankshaft 612.

Figure 32:
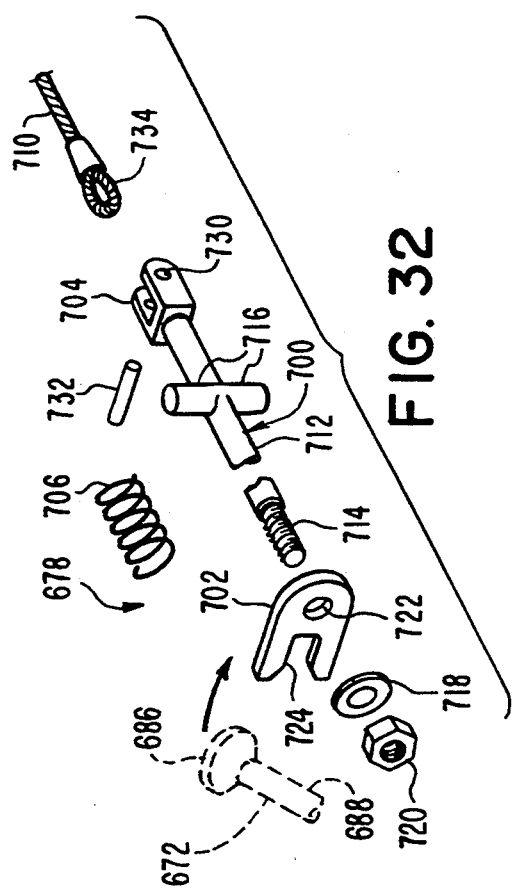
FIG. 32 is a partial, exploded perspective view of the trigger pin assembly in accordance with the second embodiment of the present invention.
Figure 36:
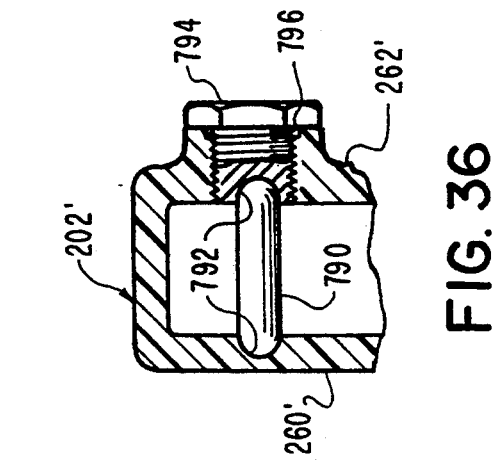
FIG. 36 is an enlarged, partial cross-sectional view of the connector pocket of the receptacle in accordance with the second embodiment of the present invention.

As seen in FIG. 32, trigger pin assembly 678 engages head portion 686 of release pin 672 for moving release pin 672 radially outwardly from locking hole 646 to release crankshaft 612 from drive gear 622 so that crankshaft 612 rotates freely relative to drive gear 627. Trigger pin assembly 678 is coupled to the vehicle 20' and movably coupled through casing 200'.

Figure 33:
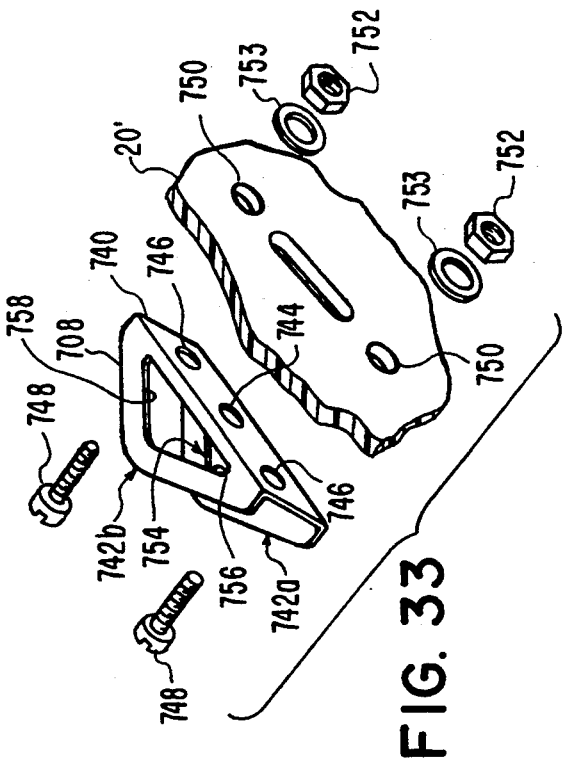
FIG. 33 is a partial, exploded elevational view of the release bracket and a portion of the vehicle in accordance with the second embodiment of the present invention.

As seen in FIGS. 32 and 33, trigger pin assembly 678 includes a trigger pin 700 slidably coupled to casing 200', an end flange 702 fixedly coupled to one end of trigger pin 700, a fork-shaped connector 704 rigidly coupled to the other end of trigger pin 700, a compression spring 706 positioned on trigger pin 700 for biasing trigger pin 700 inwardly relative to casing 200', a release bracket 708 fixedly coupled to a panel of vehicle 20', and a release cable 710 coupled to trigger pin 700 via fork-shaped connector 704 for manually moving trigger pin 700.

Trigger pin 700 includes a main cylindrical shaft portion 712 with a threaded shaft 714 at one end and a fork-shaped connector 704 at the other end. A pair of transverse arms 716 are integrally formed with main shaft portion 712 between threaded shaft 714 and fork-shaped connector 704. Threaded shaft 714 receives washer 718 and threaded nut 720 thereon for fixedly securing end flange 702 to main shaft portion 712.

End flange 702 includes a mounting hole 722 at one end for receiving threaded shaft 714 therethrough, and a U-shaped cutout 724 at the other end for receiving a portion of shaft 688 of release pin 672 therein. Specifically, when crankshaft 612 is rotated 235° so that contact pins 290' and 292' engage the contacts 28 and 35 of plug 14, the shaft 688 of release pin 672 moves into U-shaped cutout 724. Head 686 of release pin 672 is slightly larger than the width of U-shaped cutout 724 so that retraction of trigger pin 700 away from release pin housing 674 will engage head 686 of release pin 672 to move release pin 672 out of locking hole 646.

Compression spring 706 is positioned about main shaft portion 712 of trigger pin 700 to engage the inner wall of casing 200' and end flange 702 for biasing trigger pin 700 inwardly within casing 200'. Accordingly, compression spring 706 maintains end flange 702 in the correct position for receiving the end of shaft 688 of release pin 672 with head 686.

Fork-shaped connector 704 includes a pair of aligned holes 730 for receiving a mounting pin 732 therein to couple the looped end 734 of release cable 710 to trigger pin 700. Accordingly, when release cable 710 is pulled, this will cause trigger pin 700, as well as release pin 672, to move outwardly against the force of compression springs 706 and 676, respectively.

Referring to FIG. 33, release bracket 708 is substantially U-shaped, with a mounting plate 740 and a pair of trigger pin guide legs 742a and 742b. Mounting plate 740 includes a center hole 744 for receiving shaft portion 712 of trigger pin 700 therethrough, and a pair of mounting holes 746 for receiving screws 748 therethrough to fasten mounting plate 740 to a panel of vehicle 20'. Specifically, screws 748 extend through mounting holes 746 and through a pair of mounting holes 750 in the panel of vehicle 20', and then threadedly receive a pair of nuts 752 and a pair of washers 753. Accordingly, release bracket 708 is fixedly secured to vehicle 20'.

Guide legs 742a and 742b are substantially identical, and extend substantially perpendicularly from mounting plate 740. Each of the guide legs 742a and 742b has a triangular opening 754 for receiving therein one of the transverse arms 716 to limit inward movement of trigger pin 700 by compression spring 706. In particular, compression spring 706 biases trigger pin 700 inwardly into casing 200' so that transverse arms 716 seat in the apex of triangular openings 754. Also, triangular openings 754 of guide legs 742a and 742b restrict the rotational movement of trigger pin 700 so that end flange 702 always remains in the correct position to receive the head of release pin 672. The two edges 756 and 758 of each of the triangular openings 754 act as camming surfaces or edges for engaging transverse arms 716 of trigger pin 700 upon application of an excessive force on cable 16 of plug 14, causing casing 200' to move or pivot relative to vehicle 20'.

Casing 200' of receptacle 18' is substantially identical to casing 200 of receptacle 18, except for minor modifications to the connector pocket 202' and the manner in which it is mounted to vehicle 20'. Specifically, casing 200' includes a pair of vertically extending flanges 760 rigidly coupled to casing 200', a pivot block 764 pivotally coupled to flanges 760 via a horizontally extending pivot pin 766, and a threaded hole 768 located at the lower end of casing 200' for receiving a threaded shear pin 770 to rigidly secure casing 200' to vehicle 20'.

As seen in FIGS. 28 and 29, pivot block 764 includes a pair of horizontal holes 772 and 774. Hole 772 is located at one end of pivot block 764 and receives pivot pin 766 for permitting pivotal movement of casing 200' when shear pin 770 is either broken or disengaged from threaded hole 768. Hole 774 is located at the other end of pivot block 764 and extends substantially perpendicularly to hole 772 for receiving a pivot pin 780. Pivot pin 780 extends through hole 774 of pivot block 764 and through a pair of holes 782 in downwardly extending flanges 784 which are rigidly coupled to vehicle 20'. Accordingly, pivot block 764 permits casing 200' to pivot in a first direction about pivot pin 780 in a second direction substantially perpendicular to the first direction about pin 766 when shear pin 770 is broken or disengaged from threaded hole 768.

Figure 35:
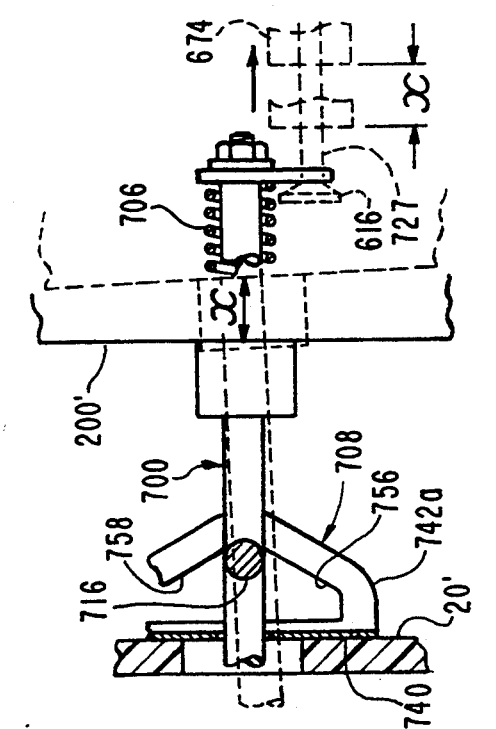
FIG. 35 is a partial, top plan view of the trigger pin assembly in accordance with the second embodiment of the present invention.
Figure 34:
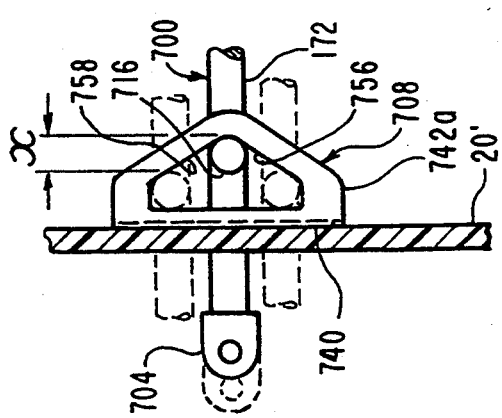
FIG. 34 is a partial, elevational view of the trigger pin assembly in accordance with the second embodiment of the present invention.

As seen in FIG. 35, connector pocket 202' has a connector pivot pin or trunnion 790 secured between the two end walls 260' and 262', and is designed to release from connector pocket 202' when a precalibrated, break-away force is applied to pin 790. Specifically, the ends of pivot pin 790 are substantially hemispherically shaped and fit into corresponding hemispherical depressions 792 formed in resilient end walls 260' and 262'. Preferably, end wall 262' includes a retention nut 794 threadedly received in a threaded bore 796 in end wall 262' with one of the semi-spherical depressions 792 therein. If a break-away force is applied to pin 790, then walls 260' and 262' will flex outwardly to allow pin 790 to release from the semi-spherical depressions 792. Retention nut 794 can be used to calibrate the break-away force required to cause pin 790 to release.

Operation of Receptacle 18'

In normal operation, casing 200' of receptacle 18' is held rigidly in place by shear pin 770 which is mounted in bracket 771 of vehicle 20'. Shear pin 770 has a shear groove 773 which is calibrated to break at the reduced shank diameter at a predetermined shear or tensile stress level. Of course, it will be apparent to those skilled in the art that shear pin 770 could be replaced with an elastomeric element that will permit displacement in the appropriate directions about pivot pins 766 and 780 at a predetermined, calibrated value to allow trigger pin assembly 678 to operate and retract the contact pins 290' and 292'.

If a break-away force is applied onto cable 16 of plug 14 and breaks shear pin 770, then pivot block 764 will allow casing 200' to rotate either outwardly via pivot pin 780 or from side to side via pivot pin 766, depending upon the direction of force applied to cable 16. This pivotal movement of casing 200' will cause release pin assembly 624 to disengage drive gear 622 from crankshaft 612 and retract contact pins 290' and 292', as well as control shaft 434', from plug 14. Accordingly, the release pin assembly 624 disconnects plug 14 from connector pocket 202' of casing 200' when the permissible tensile force on cable 16 is exceeded in all directions, except for a force in a substantially vertically and downwardly extending direction. This exception is acceptable, because the probability of encountering a vertically downwardly extending force on cable 16 of plug 14, which will cause an emergency situation, is unlikely to occur.

It should be noted that forces applied to cable 16 in intermediate directions from the right angle directions of pivot pins 766 and 780 shown in the drawings will cause casing 200' to displace in a combination of directions to operate release pin assembly 624.

In particular, when a pulling force on cable 16 of plug 14 exceeds the predetermined, acceptable value, then the pulling force is transmitted to shear pin 720, causing the stress in the shear pin 770 to exceed its calibrated shear or tensile value and break. Casing 200' is now free to pivot about pivot pins 766 and 780, and thus trip release pin assembly 624.

If cable 16 of plug 14 is pulled to the left or right of the direction of insertion of plug 14 into connector pocket 202' by a break-away force which breaks shear pin 770, then casing 200' will rotate to the left or right about pivot pin 766. This rotation of casing 200' will cause relative movement between trigger pin 700 and casing 200' to pull release pin 672 from locking hole 646. Specifically, trigger pin 700 is held from moving with casing 200' by release bracket 708. In particular, transverse arms 716 of trigger pin 700 are initially seated in the apex of triangular openings 754 and then are cammed outwardly away from casing 200' by either camming edges 756 or 758 depending if casing 200' is pulled to the left or right by the force applied to plug 14.

In other words, transverse arms 716 engage camming edges 756 or 758 of triangular slots 754 in stationary release bracket 708 to move trigger pin 700 outwardly along its longitudinal axis by dimension "X" during rotation of casing 200' about pivot pin 766. The dimension "X" is the required distance trigger pin 700 must move relative to casing 200' to extract release pin 672 from locking hole 646 for allowing crankshaft 612 to spin counterclockwise via coil spring 670, and thus withdraw contact pins 290' and 292' and control shaft 434'.

In the event that cable 16 of plug 14 is pulled outwardly by a break-away force, shear pin 770 will fail in tension, causing casing 200' of receptacle 18 to rotate about pin 780 to the position shown in the dotted lines. Since transverse arms 716 are seated in the apex of the stationary release bracket 708, trigger pin 700 will not move outwardly with casing 200'. Rather, the outward movement of casing 200' by dimension "X" causes release pin assembly 624 to be displaced by dimension "X" relative to casing 200'. Thus, release pin 672 is extracted from locking hole 646 to permit the crankshaft 612 to spin in a counterclockwise direction via coil spring 670 to retract the contact pins 290' and 292' and control shaft 434'.

If plug 14 does not readily release from pin 790 of connector pocket 202' when a break-away force is applied to cable 16, then pin 790 will release from its semispherical depressions 792 by flexing the compliant or resilient walls 260' and 262' of connector pocket 202'.

After an emergency release, casing 200' is restored to its normal operating position by replacing shear pin 770 and pivot pin 790 and then driving motor 430' to place coil spring 670 in torsion and to allow release pin 672 to move into locking hole 646 via spring 676.

Manual release is accomplished simply by pulling on release cable 710 which will displace trigger pin 700 outwardly from casing 200'. This outward movement of trigger pin 700 will pull release pin 672 out of locking hole 646 to allow crankshaft 612 to spin in a counterclockwise direction via coil spring 670. Accordingly, as crankshaft 612 spins in the counterclockwise direction, contact pins 290' and 292' and control shaft 434' are withdrawn from engagement with plug 14.

While only two embodiments have been chosen to illustrate the invention, it will be understood by those skilled in the art that various changes and modifications can be made herein without departing from the scope of the invention as defined in the appended claims.

What is claimed is:

1. An electrical connector system, the combination comprising:

a receptacle having a first contact housing, a first set of electrical contacts coupled to said first contact housing, and an inlet cavity;
first shutter means, movably coupled within said inlet cavity of said first contact housing, for selectively covering and exposing said first set of contacts;
a plug having a second set of electrical contacts and a second contact housing for housing said second set of contacts, one of said first and second sets of electrical contacts being movably coupled relative to said first and second housings for electrically coupling said first and second sets of electrical contacts together after insertion of said plug into said receptacle to a full insertion position;
second shutter means, movably coupled to said second contact housing, for selectively covering and exposing said second set of contacts; and
uncovering means, coupled to at least said receptacle, for selectively moving said first and second shutter means to uncover said first and second sets of contacts, respectively, to permit electrical coupling of said first set of contacts with said second set of contacts, upon full insertion of said plug into said receptacle to said full insertion position, said uncovering means including
a control member for movably engaging said first and second shutter means to expose said first and second sets of electrical contacts after full insertion of said plug into said receptacle to said full insertion position, and
a first sensor coupled to one of said first and second contact housings for sensing said full insertion position of said second contact housing relative to said inlet chamber, said first sensor being operatively coupled to said control member so that said first and second contact housings remain stationary during electrical coupling of said first and second sets of electrical contacts and during uncovering of said first and second sets of contacts.

2. An electrical connector system according to claim 1, wherein
said inlet cavity is substantially unobstructed and sized for receiving said contact housing of said plug therein with substantially no force being applied between said receptacle and said plug.

3. An electrical connector system according to claim 2, wherein
said receptacle includes a first gasket for sealing said first shutter means thereto, when said first shutter means is covering said first set of contacts.

4. An electrical connector system according to claim 3, wherein
said plug includes a second gasket for sealing said second shutter means thereto, when said second shutter means is covering said second contact means.

5. An electrical connector system, the combination comprising:
a receptacle having a first set of electrical contacts coupled to said receptacle;
first shutter means, movably coupled to said receptacle, for selectively covering and exposing said first set of contacts;
a plug having a second set of electrical contacts coupled to said plug and a contact housing coupled to said plug for housing said second set of contacts;
second shutter means, movably coupled to said contact housing of said plug, for selectively covering and exposing said second set of contacts;
uncovering means, coupled to said plug and said receptacle, for selectively moving said first and second shutter means to uncover said first and second sets of contacts, respectively, to permit electrical coupling of said first set of contacts with said second set of contacts, upon insertion of said plug into said receptacle, and
said inlet cavity being substantially unobstructed and sized for receiving said contact housing of said plug therein with substantially no force being applied between said receptacle and said plug, said inlet cavity of said receptacle including a pivot pin, and said plug including hook means for engaging said pin to properly align said second set of contacts with said first set of contacts.

6. An electrical connector system according to claim 5, wherein
said pin is releasably coupled with said cavity.

7. An electrical connector system according to claim 1, wherein
said uncovering means includes motive means for automatically moving said first set of contacts relative to said second set of contacts for electrically connecting said first and second sets of contacts together, upon insertion of said plug into said receptacle.

8. An electrical connector system, the combination further comprising:
a receptacle having a first set of electrical contacts coupled to said receptacle;
first shutter means, movably coupled to said receptacle, for selectively covering and exposing said first set of contacts;
a plug having a second set of electrical contacts coupled to said plug and contact housing means, coupled to said plug, for housing said second set of contacts;
second shutter means, movably coupled to said contact housing means of said plug, for selectively covering and exposing said second set of contacts;
uncovering means, coupled to said plug and said receptacle, for selectively moving said first and second shutter means to uncover said first and second sets of contacts, respectively, to permit electrical coupling of said first set of contacts with said second set of contacts, upon insertion of said plug into said receptacle, and
motive means, coupled to one of said first and second sets of contacts, for moving at least one of said first and second contact means in a direction transverse to the direction of insertion of said plug into said receptacle.

9. An electrical connector system according to claim 8, wherein
each of said contacts of said first set includes a movable contact member and each of said contacts of said second set includes a stationary contact for electrical engagement with said movable contact members.

10. An electrical connector system according to claim 1, wherein
said first shutter means is rotatably coupled to said receptacle.

11. An electrical connector system according to claim 10, wherein said second shutter means is rotatably coupled to said plug.

12. An electrical connector system according to claim 10, further comprising motive means, coupled to said uncovering means and said first contact means, for moving said uncovering means and for subsequently moving said first contact means into electrical connection with said second contact means, upon full insertion of said plug into said receptacle.

13. An electrical connector system according to claim 12, wherein said uncovering means includes switch means for detecting full insertion of said plug into said receptacle to permit said motive means to move said first and second cover means for uncovering said first and second contact means only after full insertion of said plug into said receptacle.

14. An electrical connector system according to claim 13, further comprising break-away means, coupled to said receptacle, for disengaging said first set of contacts from said second set of contacts when coupled together and after application of an excessively high force on said plug which pulls said plug away from said receptacle.

15. An electrical connector adapted to be electrically coupled to a mating electrical connector, comprising:

an electrically insulated housing with positioning means for engaging the mating electrical connector to limit inward movement of said insulated housing relative to mating electical connector;

electrical contact means coupled within said housing;

shutter means for selectively covering said electrical contact means;

coupling means, coupled to said shutter means and said housing, for movably coupling said shutter means to said housing; and a latching member coupled to said insulated housing for engaging said shutter means to prevent said shutter means from being moved to expose said contact means until after complete insertion of said insulated housing with a mating electrical connector so that said positioning means prevents further inward movement of said insulated housing.

16. An electrical connector according to claim 15, wherein said contact means is arranged transverse to the direction of insertion with the mating electrical connector.

17. An electrical connector system, the combination comprising:

a receptacle having a first contact housing, a first electrical contact means and an inlet cavity;

first shutter means, movably coupled to said first contact housing, for selectively covering and exposing said first contact means;

a plug having a second contact housing adapted to be received in said inlet cavity of said receptacle, and a second electrical contact means for electrically coupling with said first contact means upon insertion of said second contact housing into said inlet cavity;

second shutter means, movably coupled to said second contact housing, for selectively covering and exposing said second contact means;

sensing means, coupled to one of said contact housing, for detecting a full insertion position of said second contact housing into said inlet cavity to permit electrical coupling of said first and second contact means while said first and second contact remain stationary in said full insertion position; and sealing means, coupled to said plug and said receptacle, for sealing said first and second contact means against the ingress of moisture and other contaminants before and after electrical coupling of said first and second contact means, one of said first and second contact means being movably coupled for engaging the other of said first and second contact means after said second contact housing reaches said full insertion position such that said inlet cavity engages said second contact housing to prevent further inward movement of said second contact housings relative to said first contact housings during electrical coupling of said first and second contact means.

18. An electrical connector system according to claim 17, wherein said sealing means includes at least one first sealing member positioned between said first contact housing and said first shutter means, and at least one second sealing member positioned between said second contact housing and said second shutter means.

19. An electrical connector system, the combination comprising:

a receptacle having a first contact housing, a first electrical contact means and an inlet cavity;

first shutter means, movably coupled to said first contact housing, for selectively covering and exposing said first contact means;

a plug having a second contact housing adapted to be received in said inlet cavity of said receptacle, and a second electrical contact means for electrically coupling with said first contact means upon insertion of said second contact housing into said inlet cavity;

second shutter means, movably coupled to said second contact housing, for selectively covering and exposing said second contact means; and sealing means, coupled to said plug and said receptacle, for sealing said first and second contact means against the ingress of moisture and other contaminants before and after electrical coupling of said first and second contact means, said sealing means including at least one first sealing member positioned between said first contact housing and said first shutter means, and at least one second sealing member positioned between said second contact housing and said second shutter means, said at least one first sealing member being movably coupled to said first contact housing for selectively engaging said first shutter means and a portion of said plug.

20. An electrical connector system according to claim 19, further comprising spring means for selectively biasing said at least one first sealing member against said first shutter means and said portion of said plug.

21. An electrical connector system according to claim 20, wherein said at least one first sealing member is a cylindrical tube with a pair of sealing rings.

22. An electrical connector system, the combination comprising:

a first electrical connector having a first contact housing, a set of first contacts coupled to said first housing, and a first shutter movably coupled to said first housing for selectively covering and exposing said first contacts;

a second electrical connector having a second housing, a set of second contacts coupled to said second contact housing, and a second shutter movably coupled to said second housing for selectively covering and exposing said second contacts, one of said first and second contacts being movably coupled relative to the other while said first and second contact housings remain stationary when coupled together; and breakaway means, coupled to said first contact housing, for disengaging said first contacts from said second contacts when coupled together and after application of a predetermined separation force between said first and second electrical connectors, said breakaway means including coupling means for movably coupling said first contact housing to a support only after application of the predetermined separation force between said first and second electrical connectors, and a releasing mechanism for moving said first and second contacts relative to each other to electrically disengage said first and second contacts from each other prior to substantial relative movement between said first and second contact housings.

* * * * *